United States Patent [19]
Tanabe et al.

[11] Patent Number: 5,619,487
[45] Date of Patent: Apr. 8, 1997

[54] OPTICAL DATA READOUT WITH TWO BEAMS ON THREE TRACKS

[75] Inventors: Takaya Tanabe, Tokorozawa; Manabu Yamamoto, Sayama; Kikuji Katoh, Tokorozawa; Hisanobu Dobashi, Tokyo, all of Japan

[73] Assignee: Nippon Telegraph and Telephone Corporation, Tokyo, Japan

[21] Appl. No.: 511,242

[22] Filed: Aug. 4, 1995

[30] Foreign Application Priority Data

| Aug. 10, 1994 | [JP] | Japan | 6-188039 |
| Sep. 5, 1994 | [JP] | Japan | 6-211571 |
| Mar. 6, 1995 | [JP] | Japan | 7-045832 |

[51] Int. Cl.$^6$ ..................................................... G11B 7/00
[52] U.S. Cl. .................. 369/100; 369/44.37; 369/44.41
[58] Field of Search ............................ 369/44.26, 44.37, 369/54, 100, 112, 109, 13

[56] References Cited

U.S. PATENT DOCUMENTS

| 5,216,652 | 6/1993 | Yoshio et al. | 369/44.37 |
| 5,233,583 | 8/1993 | Reno | 369/44.26 |
| 5,400,312 | 3/1995 | Haraguchi | 369/44.37 |
| 5,420,847 | 5/1995 | Maeda et al. | 369/44.37 |
| 5,450,387 | 9/1995 | Ono et al. | 369/44.37 |

FOREIGN PATENT DOCUMENTS

| 0491458A1 | 6/1992 | European Pat. Off. . |
| 0574886A2 | 12/1993 | European Pat. Off. . |
| 2634243 | 2/1978 | Germany . |
| 61-117744 | 6/1986 | Japan . |
| 63-214919 | 9/1988 | Japan . |
| 4-216325 | 8/1992 | Japan . |
| 4-247329 | 9/1992 | Japan . |

OTHER PUBLICATIONS

"Hisanobu Dobashi et al.", Three–track Readout Method Using Two Offset Beams, Proceedings of the 1995 IEICE General Conference, p. 63, Mar. 1995. An English language abstract of this document is also attached.

*Primary Examiner*—Georgia Y. Epps
*Assistant Examiner*—Kim-Kwok Chu
*Attorney, Agent, or Firm*—Finnegan, Henderson, Farabow, Garrett & Dunner, L.L.P.

[57] ABSTRACT

The present invention provides a data readout apparatus and method using optical beams by which high data-recording density for optical recording media and high transfer rate for regenerated data can be realized. The data readout method of the present invention comprises the steps of: making a first optical beam incident on an optical recording medium in a manner such that in three successive tracks n−1, n, and n+1, n being an integer of two or more, on the recording medium, the center of the beam spot of the first optical beam lies, in a transverse direction of the tracks, between the boundary point of tracks n−1 and n and the center of track n−1; making a second optical beam incident on the optical recording medium in a manner such that the center of the beam spot of the second optical beam lies, in the transverse direction of the tracks, between the boundary point of tracks n+1 and n and the center of track n+1; detecting reflected beams of the first and second optical beams from the optical recording medium; and regenerating data recorded on the three tracks in accordance with levels of the detected reflected beams. According to this, data sequences recorded on three successive tracks can be regenerated simultaneously by using two optical beams; thus, even if the track pitch is narrowed, it is possible to detect signals without the influence of crosstalk, and the data transfer rate can be increased. The apparatus for implementing this method allows simpler circuit arrangement.

21 Claims, 21 Drawing Sheets

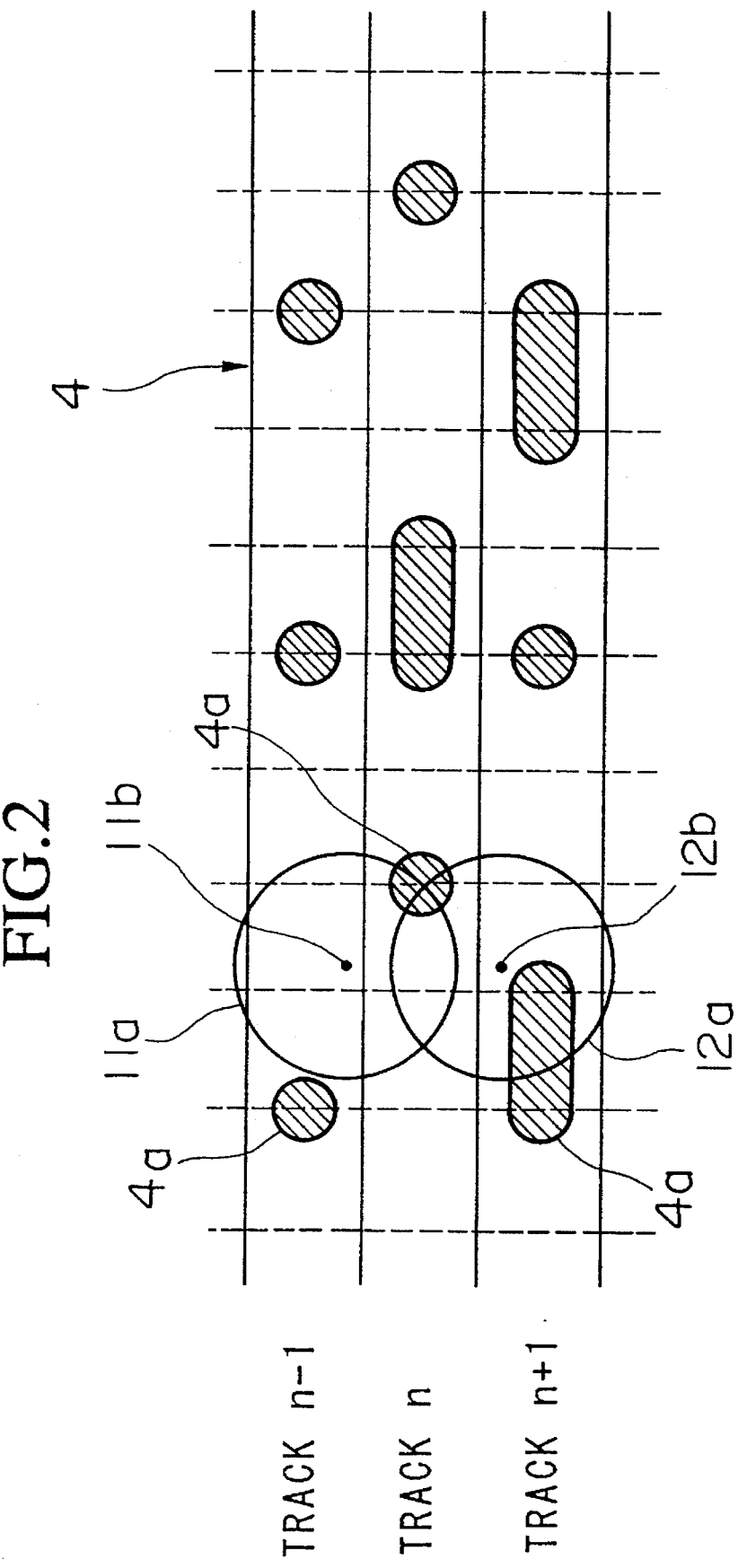

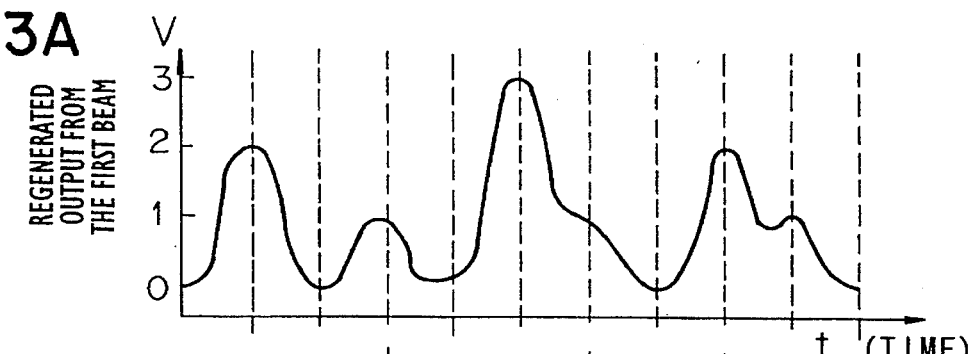
FIG. 3A
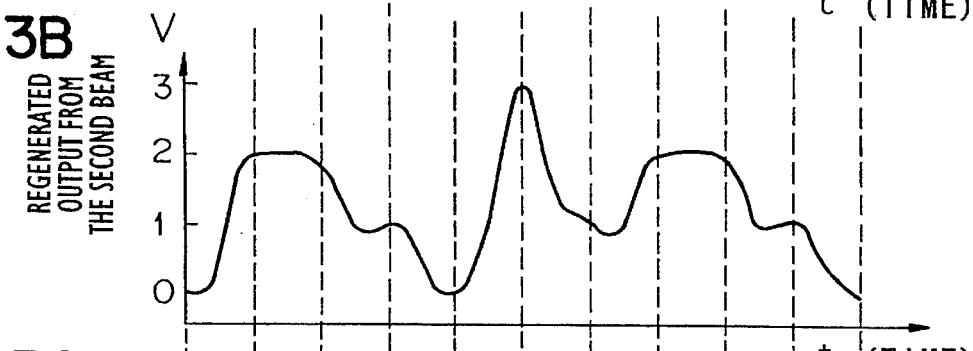
FIG. 3B
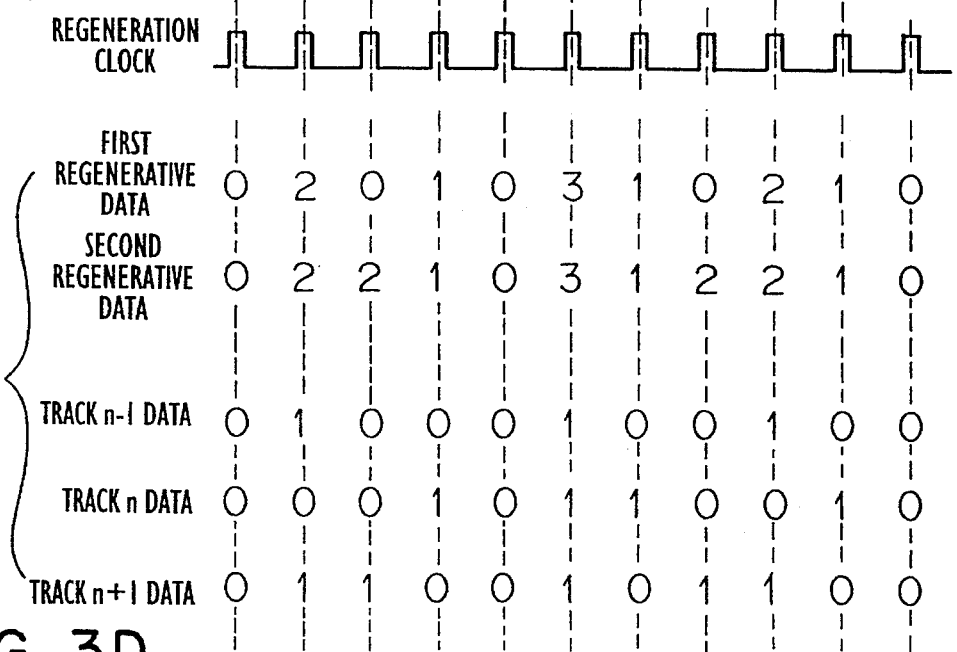
FIG. 3C
FIG. 3D

| 1ST REGENERATIVE DATUM / 2ND REGENERATIVE DATUM | 0 | 1 | 2 | 3 |
|---|---|---|---|---|
| 0 | 000 | — | 001 | — |
| 1 | — | 010 | — | 011 |
| 2 | 100 | — | 101 | — |
| 3 | — | 110 | — | 111 |

NOTE: 1)  TRACK n+1 DATA / TRACK n DATA / TRACK n-1 DATA

2) ——— THESE PAIRS DO NOT EXIST.

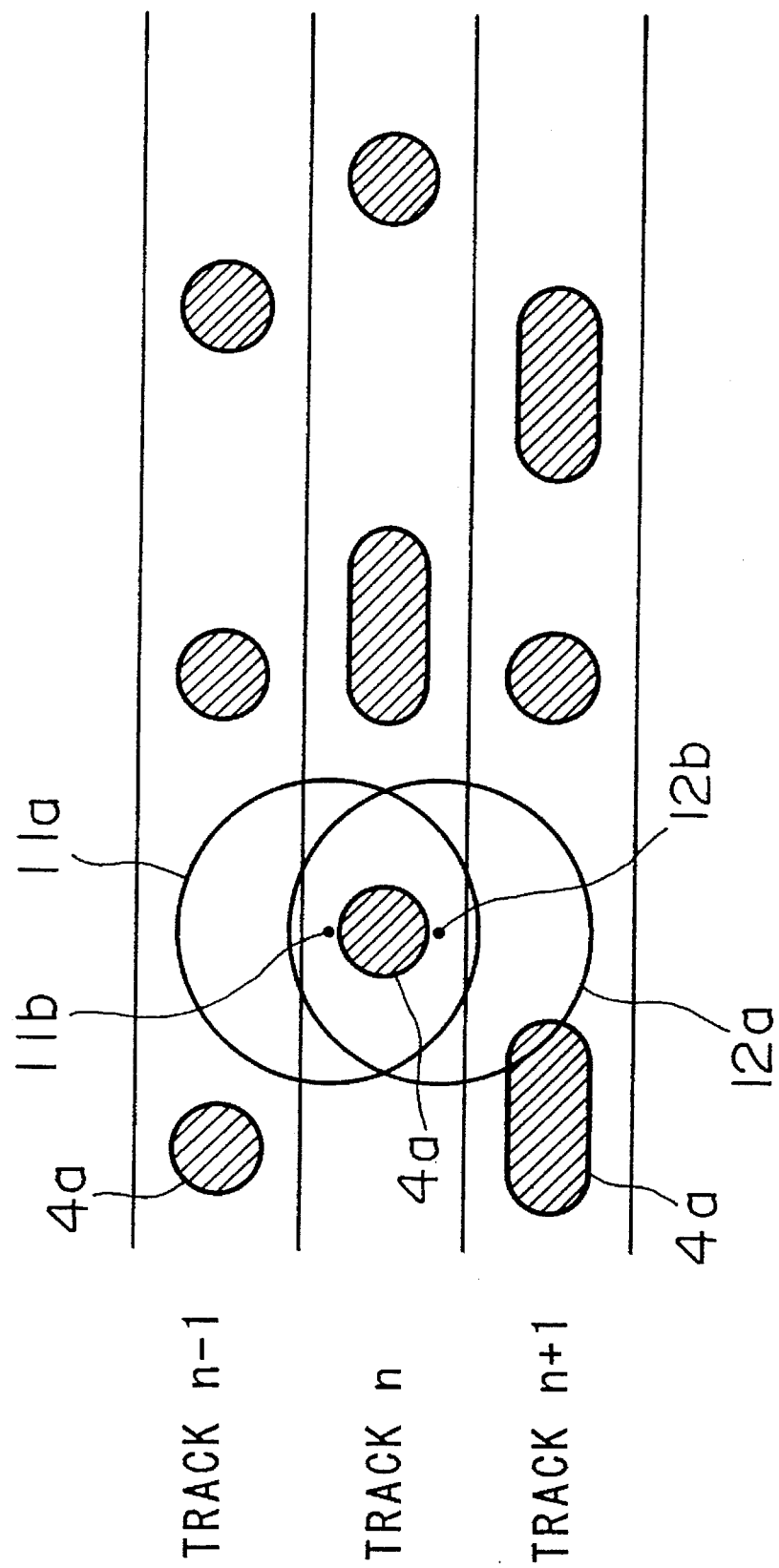

FIG. 6A
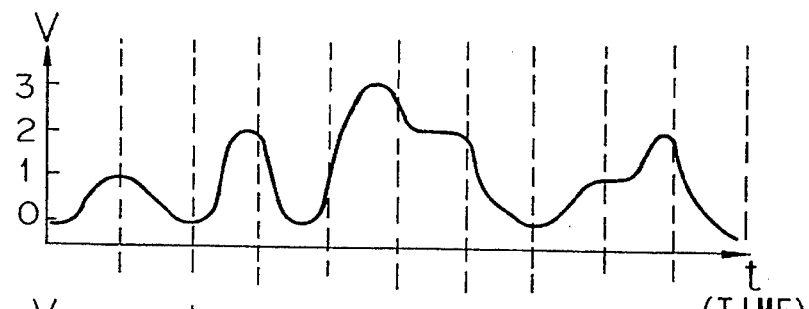
FIG. 6B
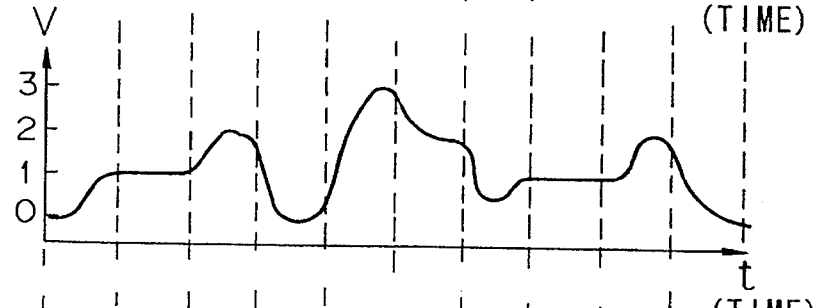
FIG. 6C
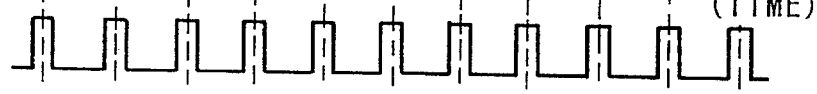
FIG. 6D

| 1ST REGENERATIVE DATUM \ 2ND REGENERATIVE DATUM | 0 | 1 | 2 | 3 |
|---|---|---|---|---|
| 0 | 000 | 001 | — | — |
| 1 | 100 | 101 | — | — |
| 2 | — | — | 010 | 011 |
| 3 | — | — | 110 | 111 |

NOTE: 1)  TRACK n+1 DATA / TRACK n DATA / TRACK n−1 DATA

2) — THESE PAIRS DO NOT EXIST.

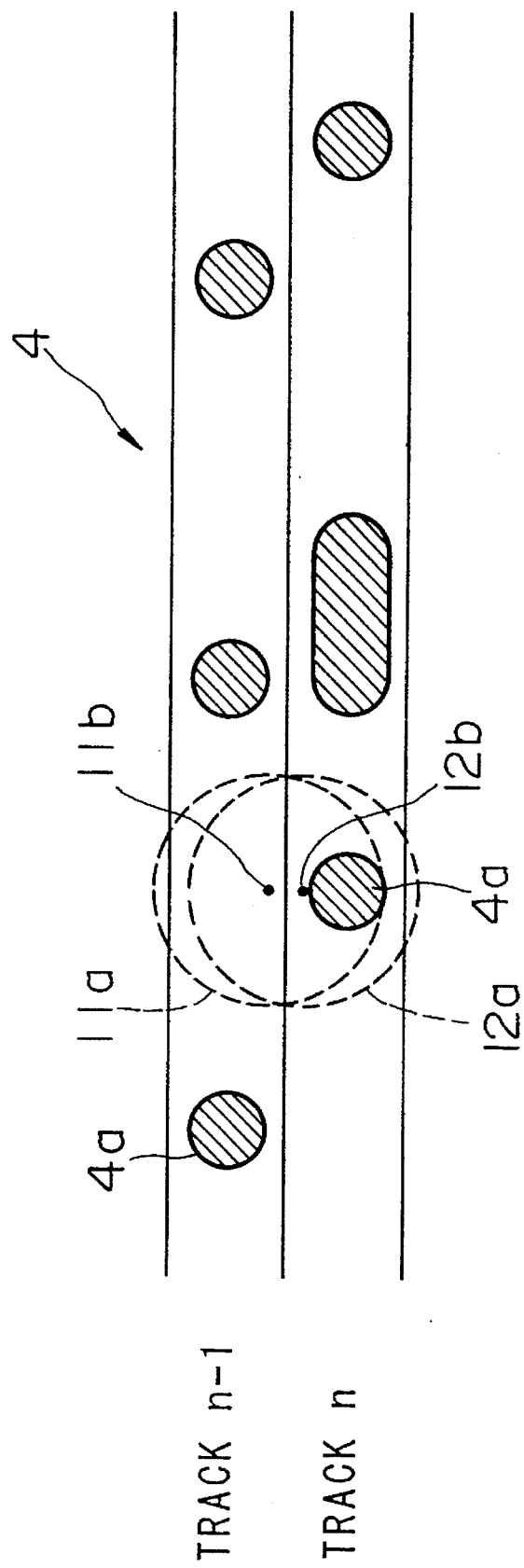

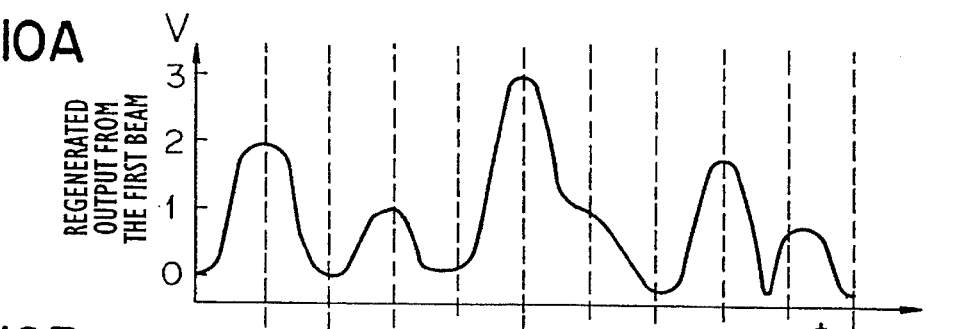
FIG. 10A
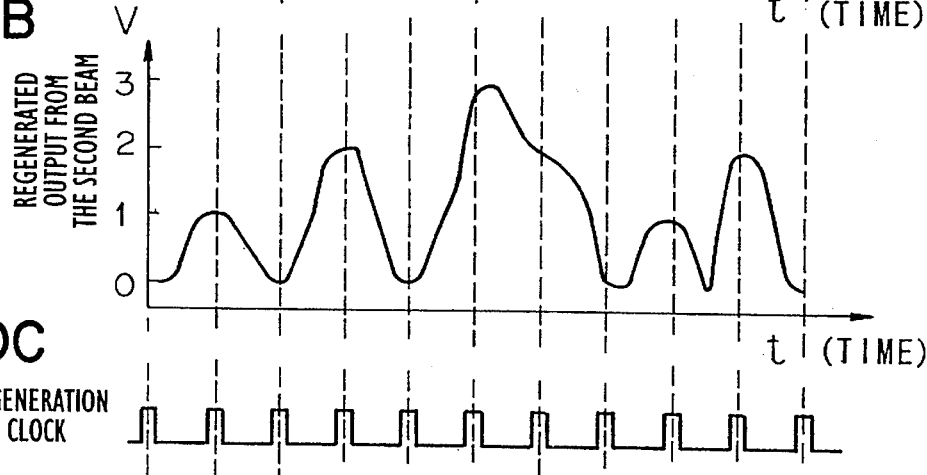
FIG. 10B
FIG. 10C
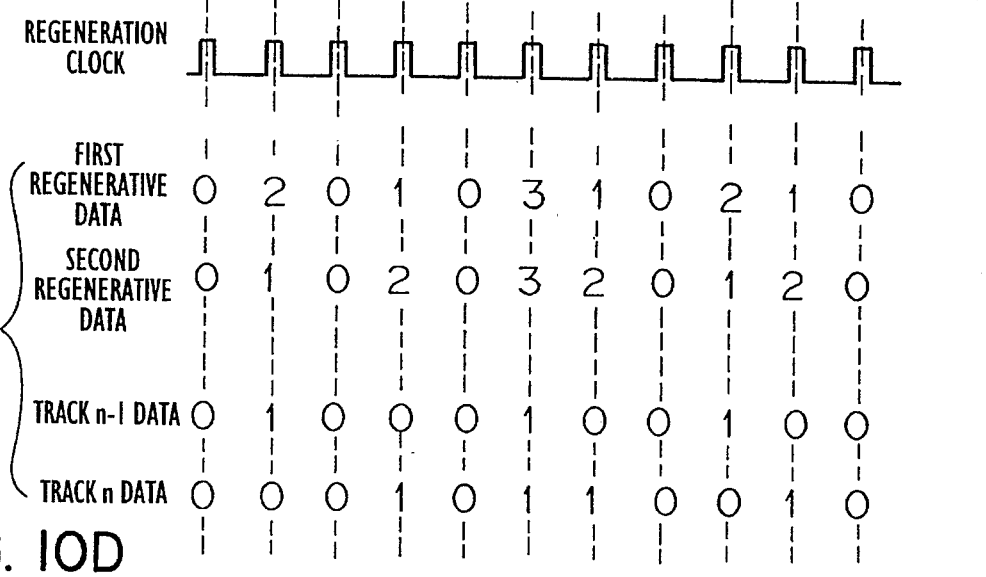
FIG. 10D

| 1ST REGENERATIVE DATUM \ 2ND REGENERATIVE DATUM | 0 | 1 | 2 | 3 |
|---|---|---|---|---|
| 0 | 00 | — | — | — |
| 1 | — | — | — | — |
| 2 | — | 10 | 01 | — |
| 3 | — | — | — | 11 |

NOTE: 1)  TRACK n DATA / TRACK n−1 DATA

2) — THESE PAIRS DO NOT EXIST.

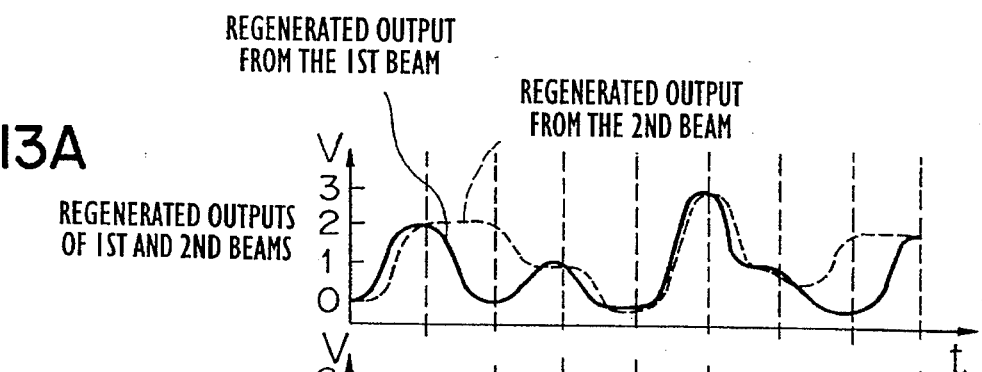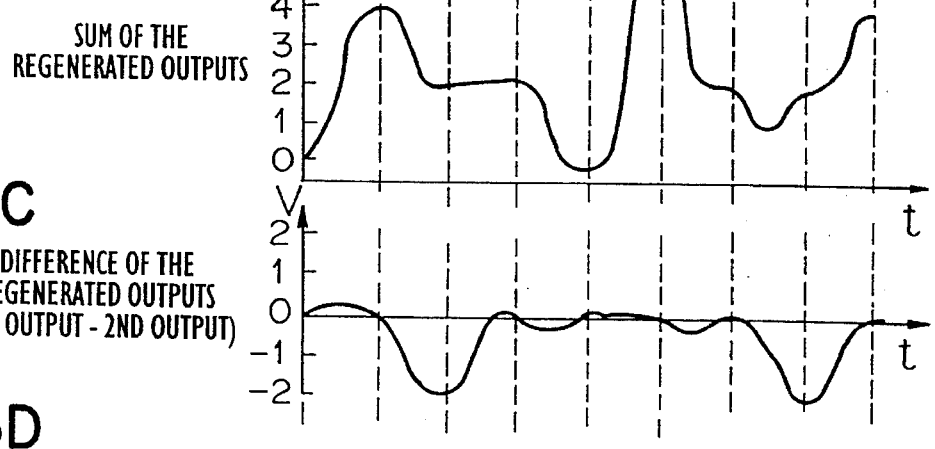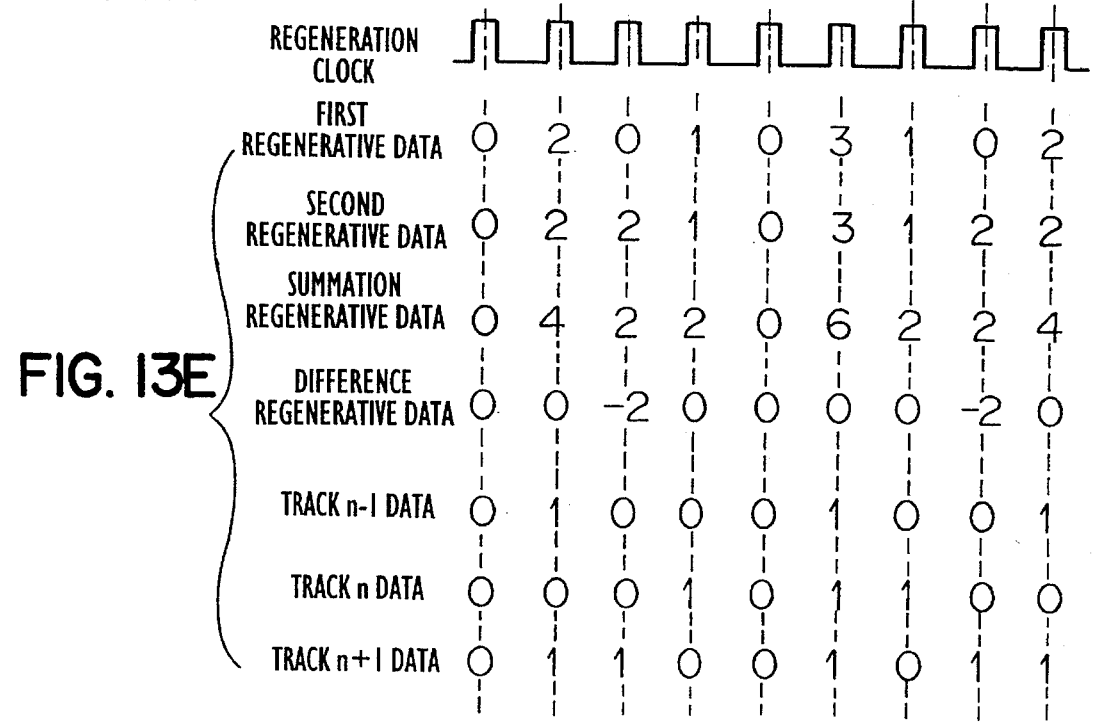

| SUMMATION REGENERATIVE DATUM / DIFFERENCE REGENERATIVE DATUM | 0 | 2 | 4 | 6 |
|---|---|---|---|---|
| -2 | — | 001 | 011 | — |
| 0 | 000 | 010 | 101 | 111 |
| 2 | — | 100 | 110 | — |

NOTE: 1)  ← TRACK n+1 DATA
            ← TRACK n DATA
            ← TRACK n-1 DATA

2) —— THESE PAIRS DO NOT EXIST.

OPTICAL DATA READOUT WITH TWO BEAMS ON THREE TRACKS

BACKGROUND OF THE INVENTION

1. Field of the Invention

The present invention relates to a data readout apparatus and method using optical beams, for regenerating data recorded oil an optical recording medium such as an optical disk.

2. Description of the Related Art

Up to the present, the increase of track density by narrowing the pitch of the track, and the increase of linear density by using a physical format which corresponds to PWM (which uses a pulse-width modulation recording) or MCAV (modified constant angular velocity) have been examined for increasing recording density in optical disks.

Regarding the track density, the track pitch has been narrowed along with the adoption of short wavelength lasers, and a track pitch of approximately 1 micrometer will soon be realized.

On the other hand, the increase of transfer rate for the data read from the optical disk is examined by using multi-beam lasers. For example, as disclosed in, for example, Japanese Patent Application, First Publication, No. Sho 61-17744, plural optical beams output from a multi-beam semiconductor laser are converged by an optical system at plural points on an optical recording medium. Reflected beams from the recording medium are then introduced to optical detectors. The data recorded on the plural points of the recorded medium are regenerated according to the light intensity or the change of direction of the polarization of each reflected beam of the plural optical beams.

However, in the above-described conventional art, regarding the realization of high-density data recording for optical disks, remarkable progress cannot be expected in the future because the development of practical short wavelength lasers is increasingly difficult technically. Moreover, regarding the realization of a high transfer rate of the regenerated data, a practical cost for such an apparatus cannot be easily achieved because in the conventional method, one optical beam can only regenerate one data sequence; thus, a number of regeneration systems corresponding to the number of multi-beams is necessary.

SUMMARY OF THE INVENTION

In consideration of the above problems, the present invention has as an object thereof to provide a data readout apparatus and method using optical beams by which high data-recording density for optical recording media and high transfer rate for regenerated data can be realized.

Therefore, the present invention provides a data readout method for regenerating data recorded on an optical recording medium by using optical beams, the method comprising the steps of: making a first optical beam incident on the optical recording medium in a manner such that in three successive tracks n−1, n, and n+1, n being an integer of two or more, on the recording medium, the center of the beam spot of the first optical beam lies, in a transverse direction of the tracks, between the boundary point of tracks n−1 and n and the center of track n−1; making a second optical beam incident on the optical recording medium in a manner such that the center of the beam spot of the second optical beam lies, in the transverse direction of the tracks, between the boundary point of tracks n+1 and n and the center of track n+1; detecting reflected beams of the first and second optical beams from the optical recording medium; and regenerating data recorded on the three tracks in accordance with levels of the detected reflected beams.

According to this method, data sequences recorded on three successive tracks can be regenerated simultaneously by using two optical beams; thus, even if the track pitch is narrowed, it is possible to detect signals without the influence of crosstalk, and the data transfer rate can be increased. Furthermore, the track density can be increased by fifty percent or more.

The present invention also provides a data readout apparatus for regenerating data recorded on an optical recording medium by using optical beams, the apparatus comprising: an optical beam generating means for generating first and second optical beams; a first converging means for converging the first optical beam to the optical recording medium in a manner such that in three successive tracks n−1, n, and n+1, n being an integer of two or more, on the recording medium, the center of the beam spot of the first optical beam lies, in a transverse direction of the tracks, between the boundary point of tracks n−1 and n and the center of track n−1; a second converging means for converging the second optical beam to the optical recording medium in a manner such that the center of the beam spot of the second optical beam lies, in the transverse direction of the tracks, between the boundary point of tracks n−1 and n and the center of track n−1; a first photo-detecting means for detecting a reflected beam of the first optical beam from the optical recording medium; a second photo-detecting means for detecting a reflected beam of the second optical beam from the optical recording medium; and a calculating means for performing calculation in accordance with levels of the detected reflected beams so as to regenerate data recorded on the three tracks.

According to this apparatus, the effects which can be obtained by the above data readout method can be realized by a simple circuit arrangement.

Additionally, in the above method or apparatus, the first optical beam may be made incident on the optical recording medium in a manner such that in three successive tracks n−1, n, and n+1, n being an integer of two or more, on the recording medium, the center of the beam spot of the first optical beam lies, in a transverse direction of the tracks, between the boundary point of tracks n−1 and n and the center of track n; and the second optical beam may be made incident on the optical recording medium in a manner such that the center of the beam spot of the second optical beam lies, in the transverse direction of the tracks, between the boundary point of tracks n+1 and n and the center of track n.

Furthermore, if determining the data recorded on three tracks in accordance with the summation and difference of the regenerated signals by the two optical beams, accuracy for the data regeneration can be improved 1.5 or more times in comparison with that of the case in which the regenerated signals by the two optical beams are directly used.

The present invention further provides a data readout method for regenerating data recorded on an optical recording medium by using optical beams, the method comprising the steps of: making a first optical beam incident on the optical recording medium in a manner such that in two successive tracks n−1 and n, n being an integer of two or more, on the recording medium, the center of the beam spot of the first optical beam lies, in a transverse direction of the tracks, between the boundary point of tracks n−1 and n and the center of track n−1; making a second optical beam incident on the optical recording medium in a manner such that the center of the beam spot of the second optical beam lies, in the transverse direction of the tracks, between the boundary point of tracks n−1 and n and the center of track n; detecting reflected beams of the first and second optical beams from the optical recording medium; and regenerating data recorded on the two tracks in accordance with levels of the detected reflected beams.

Also according to this method, data sequences recorded on two successive tracks can be regenerated by using two optical beams; thus, even if the track pitch is narrowed, it is possible to detect signals without the influence of crosstalk.

The present invention also provides a data readout apparatus for regenerating data recorded on an optical recording medium by using optical beams, the apparatus comprising: an optical beam generating means for generating first and second optical beams; a first converging means for converging the first optical beam to the optical recording medium in a manner such that in two successive tracks n−1 and n, n being an integer of two or more, on the recording medium, the center of the beam spot of the first optical beam lies, in a transverse direction of the tracks, between the boundary point of tracks n−1 and n and the center of track n−1; a second converging means for converging the second optical beam to the optical recording medium in a manner such that the center of the beam spot of the second optical beam lies, in the transverse direction of the tracks, between the boundary point of tracks n−1 and n and the center of track n; a first photo-detecting means for detecting a reflected beam of the first optical beam from the optical recording medium; a second photo-detecting means for detecting a reflected beam of the second optical beam from the optical recording medium; and a calculating means for performing calculation in accordance with levels of the detected reflected beams so as to regenerate data recorded on the two tracks.

According to this apparatus, effects as mentioned above can be obtained by a simpler circuit arrangement.

BRIEF DESCRIPTION OF THE DRAWINGS

FIG. 2 shows a positional relationship between two beam spots and tracks on the optical recording medium in the first embodiment.

FIG. 3A, 3B, 3C, and 3D show signal waveforms and corresponding track data according to a data readout method of the first embodiment.

FIG. 5 shows a positional relationship between two beam spots and tracks on the optical recording medium in a variation of the first embodiment.

FIGS. 6A, 6B, 6C, and 6D are signal waveforms and corresponding track data according to a data readout method of the variation.

FIG. 9 shows a positional relationship between two beam spots and tracks on the optical recording medium in the third embodiment of the present invention.

FIG. 10A, 10B, 10C, and 10D are signal waveforms and corresponding track data according to a data readout method of the third embodiment.

FIG. 13A, 13B, 13C, 13D, and 13E are signal waveforms and corresponding track data according to a data readout method of the fourth embodiment.

DESCRIPTION OF THE PREFERRED EMBODIMENTS

Hereinafter, embodiments of the apparatus according to the present invention will be explained with reference to the figures.

First Embodiment

Figure 1:
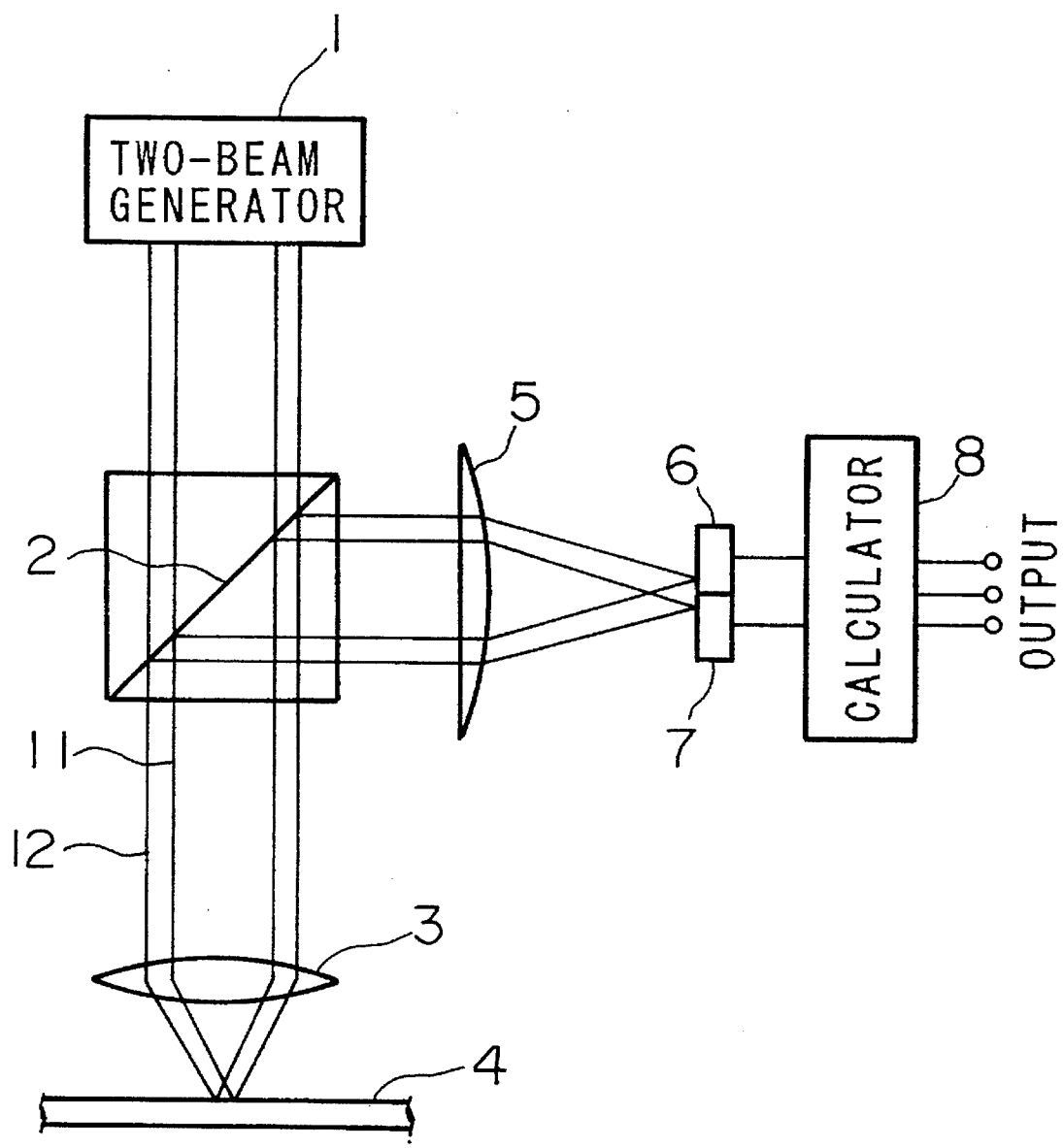
FIG. 1 is a block diagram showing the data readout apparatus according to the first embodiment of the present invention.

FIG. 1 is a block diagram showing the data readout apparatus according to the first embodiment of the present invention. In FIG. 1, reference numeral 1 indicates a two-beam generator for generating two optical beams; reference numeral 2 indicates a regenerated-beam separator including a beam splitter, etc.; reference numeral 3 indicates an objective lens for forming optical beam spots on optical recording medium 4, the optical recording medium 4 being an optical disk, compact disk, DVD (digital video disk), and the like; reference numeral 5 indicates a beam separator using a convergence lens; reference numeral 6 indicates a first photo-detector; reference numeral 7 indicates a second photo-detector; and reference numeral 8 indicates a calculator.

The two-beam generator 1 outputs two laser beams by means of a two-beam laser or beam-compositor and the like. These two optical beams pass through regenerated-beam separator 2 and are converged at spots on the optical recording medium 4 by objective lens 3.

FIG. 2 shows a positional relationship between three tracks n−1, n, and n+1 (n is an integer of two or more) on optical recording medium 4 and two spots produced by the two optical beams.

Here, optical recording medium 4 is a conventional optical disk, and recorded marks (pits) 4a, 4a . . . which correspond to binary data are formed on the tracks running on its surface, as shown in FIG. 2. On the medium 4, spot 11a of the first optical beam 11 and spot 12a of the second optical beam 12 are formed at positions shown in FIG. 2. That is, two spots 11a and 12a are formed on three successive tracks n−1, n, and n+1.

The reflected beams (regenerated beam) from the spots 11a and 12a are separated from the incident beams (from two-beam generator 1) by regenerated-beam separator 2. The regenerated beam from the first beam spot 11a is converged at the first photo-detector 6 by beam separator 5, while the regenerated beam from the second beam spot 12a is converged at the second photo-detector 7 by the beam separator 5. The first and second photo-detectors then output electrical signals which indicate levels of the detected beams, and each output is input into calculator 8. Calculator 8 performs calculation with regard to these output signals, by which the data recorded on three tracks n+1, n, and n+1 are regenerated.

Next, a method of regenerating data recorded on three tracks n−1, n, and n+1 by using two optical beams will be explained in detail with reference to FIGS. 2–4.

As shown in FIG. 2, the convergence of optical beams 11 and 12 to the optical recording medium 4 is performed in a manner such that spot-center 11b of the first optical beam 11 lies, in a transverse direction of the tracks, between the boundary point of tracks n+1 and n and the center of track n−1, and that spot-center 12b of the second optical beam 12 lies, in the transverse direction of the tracks, between the boundary point of tracks n+1 and n and the center of track n+1.

In addition, the irradiation positions of the two beams are moved in the longitudinal direction of the tracks from the left side to the right side in FIG. 2. Each dotted line in FIG. 2 shows each position which corresponds to each readout clock pulse shown in FIGS. 3A, 3B, 3C and 3D.

In the following explanation, a "signal level" from a track means a level of the amplitude of an alternating current part of light reflected from the track.

Regarding the convergence of the two beams, it is most preferable that the center 11b of beam spot 11a of the first beam 11 lie at a point satisfying the condition that the signal level from track n−1 is from one and a half times to two and a half times as much as the signal level from track n, while the center 12b of beam spot 12a of the second beam 12 lie at a point satisfying the condition that the signal level from track n+1 is from one and a half times to two and a half times as much as the signal level from track n.

The separation of two signals from two adjacent tracks is possible in principle by making the ratio of the signal level of a considered track to the signal level of a track adjacent to the considered track more than one. However, in consideration of noise and the like, the signal level from track n+1 or n−1 must be more than one and a half times as much as the signal level from track n for realizing excellent characteristics of separation of track n from track n−1 or n+1. In this way, the difference of signal levels corresponding to the difference of tracks becomes one and a half times; thus, sufficient ability to separate the signals against the fluctuation of the amplitude can be obtained.

On the other hand, if the signal level from track n+1 or n−1 exceeds two and a half times as much as the signal level From track n, the signal level from track n becomes 2/2.5 (=0.8) or less. In this case, the signal level from track n is too small to obtain sufficient ability to separate the signals against tile fluctuation of the amplitude.

Accordingly, it is preferable to make the signal level from track n+1 or n−1 one and a half times to two and a half times as much as the signal level from track n. That is, the lower limit of the signal level depends on the separation characteristic for signals from the tracks, while the upper limit of the signal level depends on a degree of lowering of the signal level of the center track (track n in the above case) of the three tracks.

By arranging the beams in this way, it is possible to obtain the data as follows. That is, the relative level of a regenerated output (corresponding to the above "signal level") obtained by the first optical beam 11 (i.e., "the first regenerative data" shown in FIG. 3D) becomes (i) 2 when a recorded mark only exists on track n−1, (ii) 1 when a recorded mark only exists on track n, and (iii) 3 when recorded marks exist on both the tracks n−1 and n.

Similarly, the relative level of a regenerated output obtained by the second optical beam 12 (i.e., "the second regenerative data" shown in FIG. 3D) becomes (i) 2 when a recorded mark only exists on track n+1, (ii) 1 when a recorded mark only exists on track n, and (iii) 3 when recorded marks exist on both the tracks n+1 and n.

Therefore, when scanning the three tracks of FIG. 2 from the left side to the right side, each regenerative datum, as shown in FIG. 3D, can be obtained by calculator 8.

Figure 4:
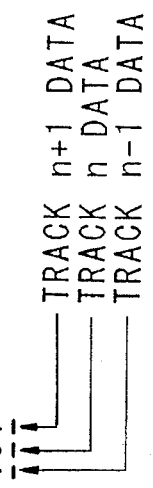
FIG. 4 shows relationships between the regenerative data obtained by the optical beams and data recorded on the tracks in the first embodiment.

Accordingly, the relationships between the first and second regenerative data and data recorded on the three tracks are defined in one-to-one correspondence, as shown in FIG. 4. For example, when the first regenerative datum of the first beam 11 is 2 and the second regenerative datum of the second beam 12 is 2, the data recorded on tracks n−1, n, n+1 are 1, 0, 1, respectively. When the first regenerative datum is 0 and the second regenerative datum is 2, the data recorded on tracks n−1, n, n+1 are 0, 0, 1, respectively. When the first regenerative datum is 1 and the second regenerative datum is 1, the data recorded on tracks n−1, n, n+1 are 0, 1, 0, respectively.

Regarding the data of three tracks n−1, n, and n+1, there are eight possible 3-digit combinations of 0 and 1, in order, as shown in FIG. 4, and each 3-digit combination depends on the combination of the regenerative data of both the optical beams. Accordingly, the data recorded on three tracks n−1, n, and n+1 can be regenerated by using the two optical beams 11 and 12.

The focusing and tracking control mechanisms which are also needed in an actual data readout apparatus are not shown in figures here. The signals used for these controls can be detected by using a beam which is separated from a readout beam by a beam splitter and the like, and the explanation for such detection will be omitted here because any known method can be used for it.

As explained above, data recorded on three tracks n−1, n, and n+1 can be regenerated by using two optical beams; thus, not only can the data transfer rate be increased, but the track density can also be increased by fifty percent or more.

In addition, at each part indicated by mark "−" in FIG. 4, no data logically exists. However, if the signal levels fluctuate due to any noise in the recording medium or in the readout system, etc., data may appear at some parts indicated by the mark "−". In such a case, making use of the characteristic that the parts indicated by the mark "−" are arranged in a checkerboard pattern, a most-likely data pattern may be chosen in accordance with each amplitude level, among data patterns around the part indicated by the mark "–". Accordingly, a detection system which is not disturbed by noise can be constructed.

In order to construct the apparatus which is not disturbed by noise, it is also possible to extend the function of calculator 8, which regenerates data recorded on three tracks, such that data which have the highest probability density of transition of the levels of the regenerated signals are selected as regenerated data so as to be able to cope with any abrupt change of the amplitude. In this way, more stable data readout can be realized.

Variation of the Embodiment

Hereinbelow, a variation of this embodiment will be explained. The structural arrangement of this variation is the same as that shown in FIG. 1; however, positions of the two beams 11 and 12 which are each converged are different from those shown in FIG. 2.

FIG. 5 shows a positional relationship between tracks n−1, n, and n+1 on optical recording medium 4 and beam spots 11a and 12a. As shown in the figure, the convergence of the beams 11 and 12 is performed in a manner such that spot-center 11b of the first optical beam 11 lies, in a transverse direction of the tracks, between the boundary point of tracks n−1 and n and the center of track n, and that spot-center 12b of the second optical beam 12 lies, in the transverse direction of the tracks, between the boundary point of tracks n+1 and n and the center of track n.

In this case, it is preferable that the center 11b of beam spot 11a of the first beam 11 lies at a point satisfying the condition that the signal level from track n is more than one and not more than three times as much as the signal level from track n−1, while the center 12b of beam spot 12a of the second beam 12 lies at a point satisfying the condition that the signal level from track n is more than one and not more than three times as much as the signal level from track n+1.

The separation of two signals from two adjacent tracks is possible in principle by making the ratio of the signal level of a considered track to the signal level of a track adjacent to the considered track to be more than one, as explained above. In this variation, the signal level from track n must be more than one times as much as the signal level from track n+1 or n−1 for realizing excellent separation characteristics. In this way, the difference of signal levels corresponding to the difference of tracks becomes more than one times; thus, sufficient ability to separate the signals against the fluctuation of the amplitude can be obtained.

On the other hand, in this variation, if the signal level from track n exceeds three times as much as the signal level from track n+1 or n−1, the signal level from track n becomes 1/(2×3) or less. In this case, the signal level from track n+1 or n−1 is too small to obtain the sufficient ability to separate the signals against the fluctuation of the amplitude and each distance from one track to another must be increased.

Accordingly, it is preferable to make the signal level from track n+1 or n−1 more than one and not more than three times as much as the signal level from track n+1 or n−1. That is, the lower limit of the signal level depends on the separation characteristics for signals from the tracks, while the upper limit of the signal level depends on the track density, and the preferred level is more than one up to three times.

Additionally, in consideration of the signal separation characteristic, when there is fluctuation in the signals, and the track density characteristic, it is more preferable to make the signal level from track n one and-a half times to two and a half times as much as the signal level from track n+1 or n−1.

FIGS. 6A, 6B, 6C, and 6D show regenerated outputs obtained in a most preferable example in which the center 11b of the first optical beam 11 lies at a point satisfying the condition that the signal level from track n is two times as much as the signal level from track n−1, while the center 12b of the second optical beam 12 lies at a point satisfying the condition that the signal level from track n is two times as much as the signal level from track n+1.

By arranging the beams like this, the relative level of the regenerated output obtained by the first optical beam 11 (i.e., "the first regenerative data" shown in FIG. 6D) becomes (i) 2 when a recorded mark only exists on track n, (ii) 1 when a recorded mark only exists on track n−1, and (iii) 3 when recorded marks exist on both the tracks n+1 and n. Similarly, the relative level of the regenerated output obtained by the second optical beam 12 (i.e., "the second regenerative data" shown in FIG. 6D) becomes (i) 2 when a recorded mark only exists on track n, (ii) 1 when a recorded mark only exists on track n+1, and (iii) 3 when recorded marks exist on both the tracks n+1 and n.

Therefore, when scanning the three tracks of FIG. 5, each regenerative datum, as shown in FIG. 6D, can be obtained by calculator 8.

Figure 7:
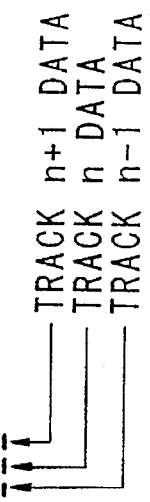
FIG. 7 shows relationships between the regenerative data obtained by the optical beams and data recorded on the tracks in the variation.

Accordingly, the relationships between the first and second regenerative data and data recorded on the three tracks are defined in one-to-one correspondence, as shown in FIG. 7. For example, when the first regenerative datum of the first beam 11 is 2 and the second regenerative datum of the second beam 12 is 2, the data recorded on tracks n−1, n, n+1 are 0, 1, 0, respectively. When the first regenerative datum is 0 and the second regenerative datum is 1, the data recorded on tracks n−1, n, n+1 are 0, 0, 1, respectively. When the first regenerative datum is 1 and the second regenerative datum is 1, the data recorded on tracks n−1, n, n+1 are 1, 0, 1, respectively.

Regarding the regeneration of data recorded only on the center track n and indicating the first and second regenerative data in FIG. 7 by symbols b1 and b2, respectively, datum "1" is regenerated in the case of "(b1+b2)>2" and datum "0" is regenerated in the case of "(b1+b2)≦2".

There are also eight possible 3-digit combinations of 0 and 1, in order, and each 3-digit combination depends on the combination of both of the regenerative data of the optical beams; therefore, the data recorded on the three tracks n−1, n, and n+1 can be regenerated by using two optical beams 11 and 12, and similar effects as described above can be obtained.

As explained above, the method of regenerating three data sequences simultaneously by using two readout beams is adopted in the first embodiment, in which even if the track pitch is narrowed, it is possible to detect signals without the influence of crosstalk. Moreover, three data sequences can be simultaneously regenerated by using two readout beams; thus, system circuits are simplified and the data transfer rate can be increased.

Second Embodiment

The second embodiment according to the present invention will be explained below.

Figure 8A:
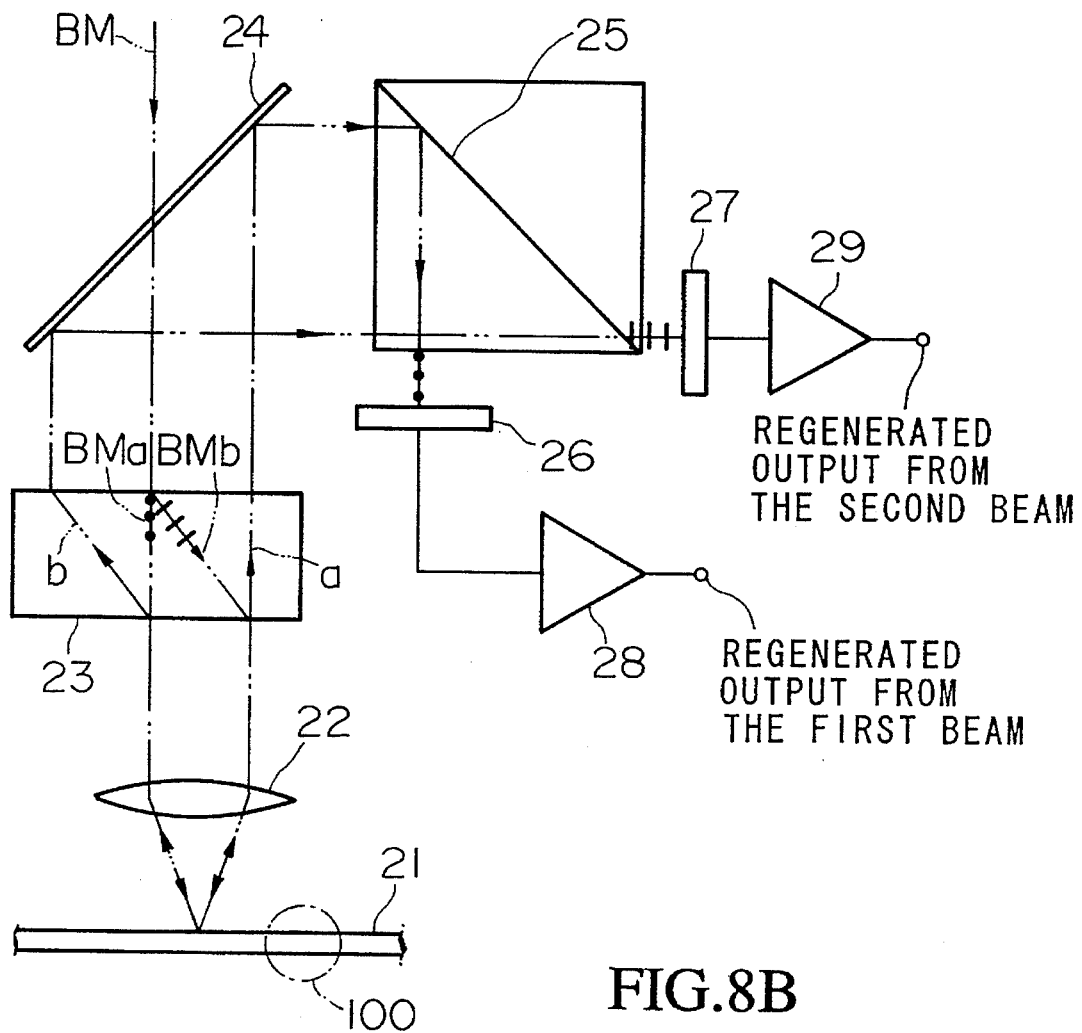
FIG. 8A is a block diagram showing the data readout apparatus according to the second embodiment of the present invention.

FIG. 8A is a block diagram showing the data readout apparatus according to the second embodiment. In contrast to the above-explained first embodiment, the second embodiment provides one incident laser beam as a distinctive feature and this laser beam is split into two beams by using a birefringent prism. That is, in FIG. 8A, reference numeral 21 indicates an optical recording medium, reference numeral 22 indicates an objective lens, reference numeral 23 indicates a birefringent prism, reference numeral 24 indicates a half mirror, reference numeral 25 indicates a polarizing prism, reference numerals 26 and 27 indicate photodiodes, reference numerals 28 and 29 indicate amplifiers, and reference symbol BM indicates an incident laser beam.

Figure 8B:
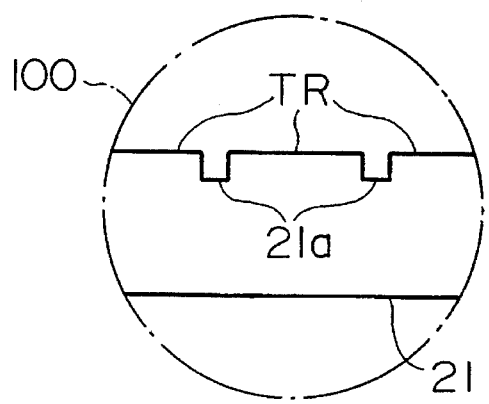
FIG. 8B is a partially expended view of optical recording medium 4.

FIG. 8B is a partially expended view of the optical recording medium 21 shown in FIG. 8A. As shown in the figure, plural tracks TN for recording information are formed at the recording medium 21, and at each boundary between two tracks, guide groove 21a for detecting a track-servo signal is formed, the grooves being used for correcting for eccentricities in the medium. In addition, format signals and the like have been previously recorded on each track TR.

The birefringent prism 23 splits incident laser beam BM into beam BMa which is polarized in parallel with respect to a longitudinal direction of guide groove 21a (i.e., the direction perpendicular to the surface of FIG. 8A) and beam BMb which is polarized perpendicularly with respect to the longitudinal direction of guide groove 21a. The prism 23 also transmits beams BMa and BMb, which have been input into the prism via objective lens 22 again, through optical paths indicated by symbols a and b, respectively.

The objective lens 22 converges beams BMa and BMb, which have output from birefringent prism 23, at predetermined spots on optical recording medium 21, and re-inputs the reflected beams from the recording medium 21 into the birefringent prism 23 as two parallel beams.

The half mirror 24 transmits incident laser beam BM and reflects beams BMa and BMb which have been input from birefringent prism 23.

The polarizing prism 25 reflects beam BMa which has been input via half mirror 24 and transmits beam BMb.

The photodiode 26 receives optical beam BMa which has been reflected by polarizing prism 25 and transforms it into an electrical signal to be input into amplifier 28.

The photodiode 27 receives optical beam BMb which has been transmitted through polarizing prism 25 and transforms it into an electrical signal to be input into amplifier 29.

Hereinafter, the operation of this embodiment having the above-explained arrangement will be explained.

First, incident laser beam BM output from a laser light source (not shown) is transmitted through half mirror 24 and is incident on birefringent prism 23.

In the birefringent prism 23, the laser beam BM is split into beam BMa which is polarized in parallel with respect to a longitudinal direction of guide groove 21a and beam BMb which is polarized perpendicularly with respect to the longitudinal direction. These beams BMa and BMb are then incident on objective lens 22 and are converged at predetermined spots on optical recording medium 21, in a manner similar to the cases shown in FIG. 2 and FIG. 5.

Optical beams BMa and BMb converged at the recording medium 21 are reflected by the medium, and are incident on birefringent prism 23 by objective lens 22. In the birefringent prism 23, beams BMa and BMb follow paths a and b, respectively, and the beams then input from the prism 23 into half mirror 24 to be reflected in one direction.

The beams BMa and BMb reflected by the half mirror 24 are incident on polarizing prism 25 at which beam BMa is reflected to be incident on photodiode 26, while beam BMb is transmitted through the prism 25 to be incident on photodiode 27.

The photodiode 26 receives the beam which corresponds to optical beam 11, the position of the spot of which is shown in FIG. 2 or FIG. 5, and the above-explained regenerated output can be obtained via amplifier 28.

The photodiode 27 receives the beam which corresponds to optical beam 12, the position of the spot of which is also shown in FIG. 2 or FIG. 5, and the above-explained regenerated output can be obtained via amplifier 29.

As explained above, according to this embodiment, three data recorded on three tracks can be regenerated by one incident laser beam BM.

That is, this second embodiment also can regenerate three data sequences simultaneously by using two readout beams; therefore, even if the track pitch is narrowed, it is possible to detect signals without the influence of crosstalk. Moreover, system circuits are simplified and the data transfer rate can be increased.

The first and second embodiments explained above can be used separately or in a combination form. In either case, similar effects can be obtained.

Third Embodiment

The third embodiment according to the present invention will be explained below.

The structural arrangement of the third embodiment is the same as that of the above-explained first embodiment; thus, explanation of the structural arrangement thereof will be omitted here. The third embodiment differs from the first embodiment in that the first and second optical beams are converged with respect to two adjacent tracks on optical recording medium 4 and data recorded on the two tracks are regenerated simultaneously.

Here, spots 11a and 11b of the first and second optical beams 11 and 12 are formed on optical recording medium 4 as shown in FIG. 9. In this case, the two spots 11a and 12a are located in two adjacent tracks n−1 and n.

The reflected beams (regenerated beam) from the spots 11a and 12a are separated from the incident beams by regenerated-beam separator 2, and the regenerated beam from the first beam spot 11a is converged at first photodetector 6 by beam separator 5, while the regenerated beam from the second beam spot 12a is converged at second photo-detector 7 by the beam separator 5. As in the first embodiment, the output signals from the first and second photo-detectors 6 and 7 are input into calculator 8, and data recorded on the two tracks n−1 and n are regenerated by calculating these output signals by using the calculator 8.

Next, a method of regenerating data recorded on two tracks n+1 and n by using two optical beams will be explained in detail, with reference to FIGS. 9–11.

FIG. 9 shows a positional relationship between the tracks n−1 and n on optical recording medium 4 and the beam spots 11a and 12a. As shown in the figure, the convergence of optical beams 11 and 12 at optical recording medium 4 is performed in a manner such that spot-center 11b of the first optical beam lies, in a transverse direction of the tracks, between the boundary point of tracks n−1 and n and the center of track n−1 and such that spot-center 12b of the second optical beam 12 lies, in the transverse direction, between the boundary point of tracks n−1 and n and the center of track n.

Regarding the convergence of the two beams, it is most preferable that the center 11b of beam spot 11a of the first beam 11 lie at a point satisfying the condition that the signal level from track n−1 is from one and a half times to two and a half times as much as the signal level from track n, while the center 12b of beam spot 12a of the second beam 12 lie at a point satisfying the condition that the signal level from track n is from one and a half times to two and a half times as much as the signal level from track n−1.

In a most preferable example in which the spot-center 11b of the first beam 11 lies at a point satisfying the condition that the signal level from track n−1 is two times as much as the signal level from track n, while the spot-center 12b of the second beam 12 lies at a point satisfying the condition that the signal level from track n is two times as much as the signal level from track n−1, regenerated outputs, as shown in FIGS. 10A, 10B, 10C, and 10D can be obtained.

By arranging the beams like this, the relative level of the regenerated output obtained by the first optical beam 11 (i.e., "the first regenerative data" shown in FIG. 10D) becomes (i) 2 when a recorded mark only exists on track n−1, and (ii) 1 when a recorded mark only exists on track n.

Similarly, the relative level of the regenerated output obtained by the second optical beam 12 (i.e., "the second regenerative data" shown in FIG. 10D) becomes (i) 2 when a recorded mark only exists on track n, and (ii) 1 when a recorded mark only exists on track n−1.

When recorded marks exist on both tracks n−1 and n, the relative level of the regenerated output becomes (iii) 3 in the cases of using either the first or the second beams.

Figure 11:
FIG. 11 shows relationships between the regenerative data obtained by the optical beams and data recorded on the tracks in the third embodiment.

Accordingly, the relationships between the first and second regenerative data and data recorded on the three tracks are defined in one-to-one correspondence, as shown in FIG. 11. Here, there are four possible 2-digit combinations of 0 and 1, and each 2-digit combination depends on the combination of both of the regenerative data of the optical beams; therefore, the data recorded on two tracks n−1 and n can be regenerated simultaneously by using two optical beams 11 and 12.

Accordingly, even if crosstalk exists between two adjacent tracks, by making use of the crosstalk, it is possible to regenerate data sequences recorded on two tracks by using two readout beams. Therefore, it is possible to perform data regeneration under the condition that the track density is increased by fifty percent in comparison with conventional cases.

In addition, at each part indicated by the mark "−" in FIG. 11, no data logically exists. However, if the signal levels fluctuate due to any noise in the recording medium or in the readout system, etc., data may appear at some parts indicated by the mark "−". In such a case, making use of the characteristic that the parts indicated by the mark "−" are arranged in a checkerboard-like pattern, a most-likely data pattern may be chosen in accordance with each amplitude level, among data patterns around the part indicated by the mark "−". Accordingly, a detection system which is not disturbed by noise can be constructed.

As in the first embodiment, in order to construct an apparatus which is not disturbed by noise, it is also possible to extend the function of the calculator, which regenerates data recorded on two tracks, such that data which have the highest probability density of transition of the levels of the regenerated signals are selected as regenerated data. In this way, more stable-data readout can be realized.

As described above, the method of regenerating two data sequences simultaneously by using two readout beams is adopted in the third embodiment, so that even if the track pitch is narrowed, it is possible to detect signals without the influence of crosstalk. In comparison with the case for three tracks, the regeneration speed is slightly decreased, but calculations are simplified and a simpler circuit-arrangement can be realized.

Fourth Embodiment

The fourth embodiment according to the present invention will be explained below with reference to FIGS. 12–16.

Figure 12:
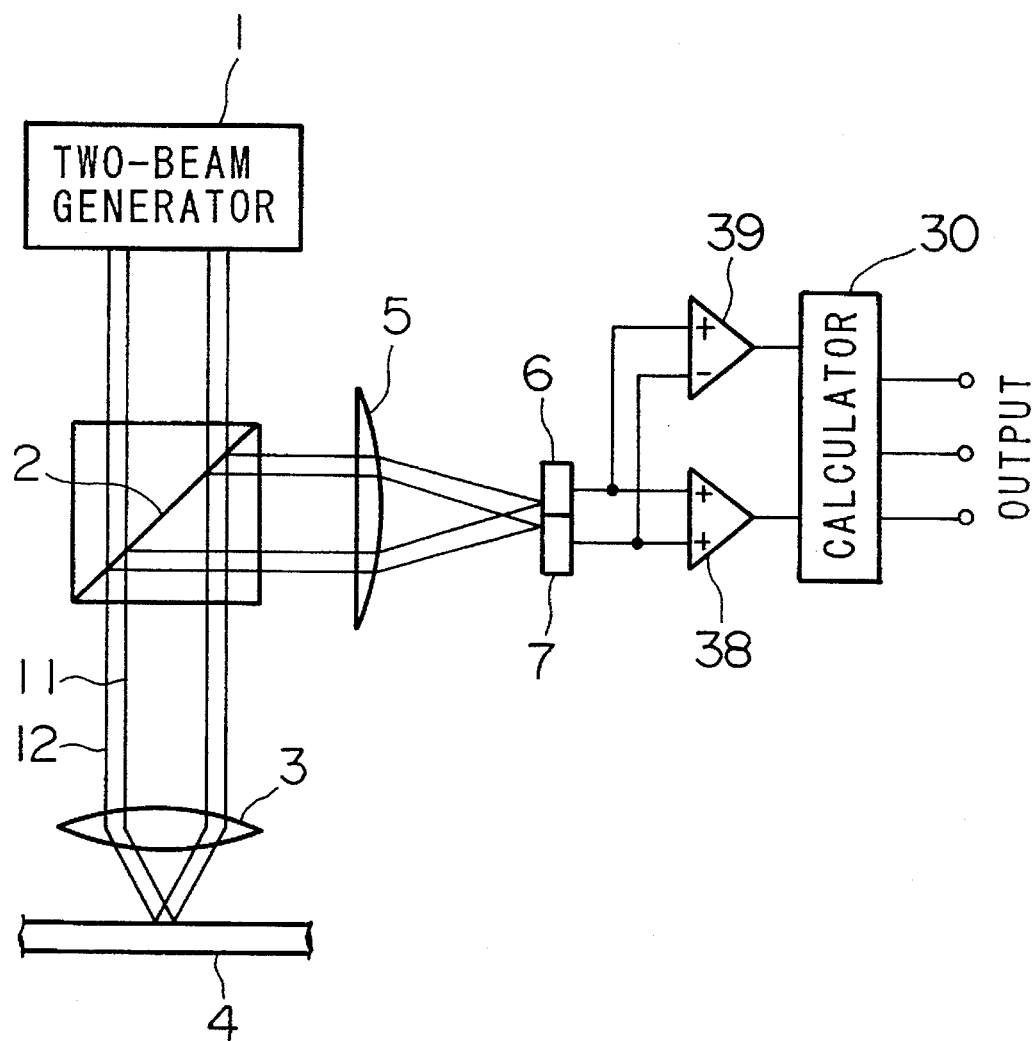
FIG. 12 is a block diagram showing the data readout apparatus according to the fourth embodiment of the present invention.

FIG. 12 is a block diagram of the data readout apparatus according to this embodiment, and parts which are identical to those shown in FIG. 1 are given identical reference numbers, and an explanation thereof will be omitted here.

In FIG. 12, reference numeral 38 indicates an adder, reference numeral 39 indicates a subtracter, and reference numeral 30 indicates a calculator.

Here, two optical beams are converged at the spots shown in FIG. 2, and regenerated beams are converged at first and second photo-detectors 6 and 7, as in the first embodiment. Each of the regenerated signals (regenerated outputs) output from these photo-detectors are input into both of adder 38 and subtracter 39, and a summation signal of both the regenerated signals is output from the adder 38, while a difference signal of both the regenerated outputs is output from the subtracter 39. These summation and difference signals are input into calculator 30, and by calculating these signals in the calculator, data recorded on the three tracks n−1, n, and n+1 are regenerated.

Next, a method for regenerating data recorded on the three tracks n−1, n, and n+1 will be explained with reference to FIGS. 13A, 13B, 13C, 13D, 13E and 14.

FIGS. 13A, 13B, and 13C show each regenerated output of each optical beam, that is, each level of the amplitude of an alternating current part of each reflected beam. Actually, each level step may not be ideal levels of 1 V, 2 V, or 3 V as show in the graph of the figure, that is, each level step may be higher or lower, so that the voltage difference between each adjacent level step may not be equal.

Considering permissible ranges, for the first optical beam 11, data regeneration is sufficiently possible if each voltage difference is from 0.5 to 1.5 times as much as ⅓ of signal level which can be obtained when recorded marks exist on both tracks n and n−1 (that is, the ideal voltage difference). Similar explanation is possible for the second optical beam 12.

Figure 15:
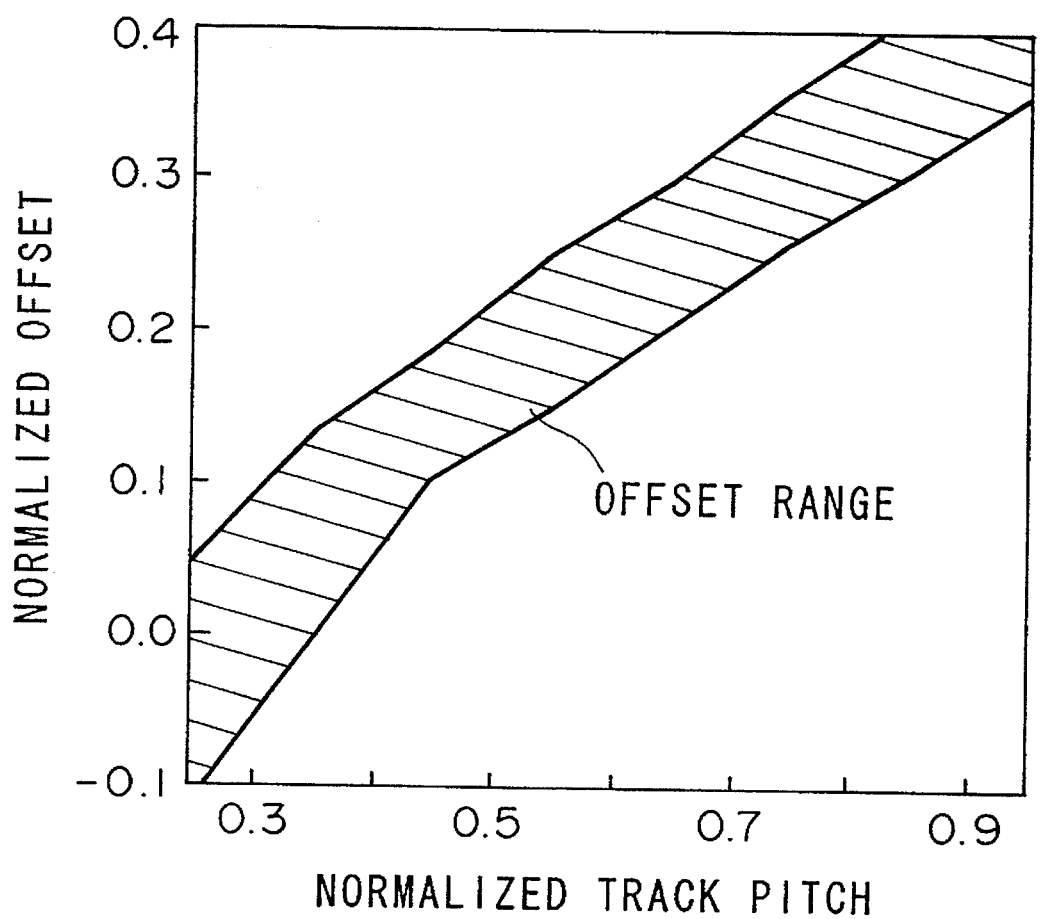
FIG. 15 shows a relationship between the offset of the optical beam and the track pitch.

FIG. 15 shows a relationship between the track pitch and the offset of the optical beam (i.e, the amount of deviation of the beam position from track n−1 or n+1 to track n), wherein the above-mentioned condition is satisfied. In the graph of FIG. 15, the horizontal axis indicates the track pitch which is normalized by the diameter of the beam spot, that is, the track pitch when the diameter of the beam spot is assumed to be "1". The vertical axis of the graph indicates the amount of the offset of the first and second optical beams from (n−1)th or (n+1)th track side to the nth track side, the amount also being normalized by the diameter of the beam spot. In addition, the width of recorded marks to be used, which is also normalized by the diameter of the beam spot, is 85 percent of the track pitch, here.

As shown in FIG. 13D, the relationship between the relative levels of the regenerated outputs of the first and second optical beams (i.e., the first and second regenerative data) is the same as that shown in FIG. 3D.

Accordingly, considering the combination of data recorded on three tracks n−1, n, and n+1, the relative level of the sum of the first and second regenerated outputs (i.e., "summation regenerative data" shown in FIG. 13D) becomes any one of 0, 2, 4, and 6, while the relative level of the difference of the first and second regenerated outputs (i.e., "difference regenerative data" shown in FIG. 13E) becomes any one of −2, 0, and 2.

In the example of FIGS. 13A, 13B, 13C, 13D and 13E the value "2" is not shown as the difference of both regenerated outputs. When the first and second regenerative data are 2 and 0 respectively, or when the first and second regenerative data are 3 and 1 respectively, the difference regenerative datum becomes 2.

Figure 14:
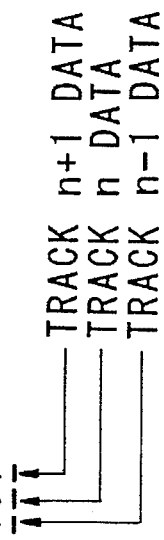
FIG. 14 shows relationships between the summation regenerative data, the difference regenerative data, and data recorded on the tracks in the fourth embodiment.

The relationships between the sum and difference of both the regenerated outputs, that is, the summation and difference regenerative data, and data recorded on three tracks are defined in one-to-one correspondence, as shown in FIG. 14. For example, when the summation regenerative datum is 4 and the difference regenerative datum is −2, the data recorded on tracks n−1, n, n+1 are 0, 1, 1, respectively. When the summation regenerative datum is 6 and the difference regenerative datum is 0, the data recorded on tracks n−1, n, n+1 are 1, 1, 1, respectively.

As shown in FIG. 14, there are eight possible 3-digit combinations of 0 and 1, in order, and each 3-digit combination depends on the combination of the sum and difference of the regenerative outputs from both the optical beams. Accordingly, the data recorded on three tracks n−1, n, and n+1 can be regenerated by using the two optical beams 11 and 12. Therefore, also in this embodiment, not only can the data transfer rate be improved, but also the track density can be increased by fifty percent or more.

Furthermore, if it is assumed that a margin for the amplitude when data of three tracks n−1, n, and n+1 are regenerated according to the regenerated signals (regenerated outputs) themselves of the first and second optical beams is 1, then a margin for the amplitude when data of the three tracks are regenerated according to the sum and difference of the regenerated signals, as in the present embodiment, becomes 2. Therefore, accuracy of the regeneration is improved.

Figure 16:
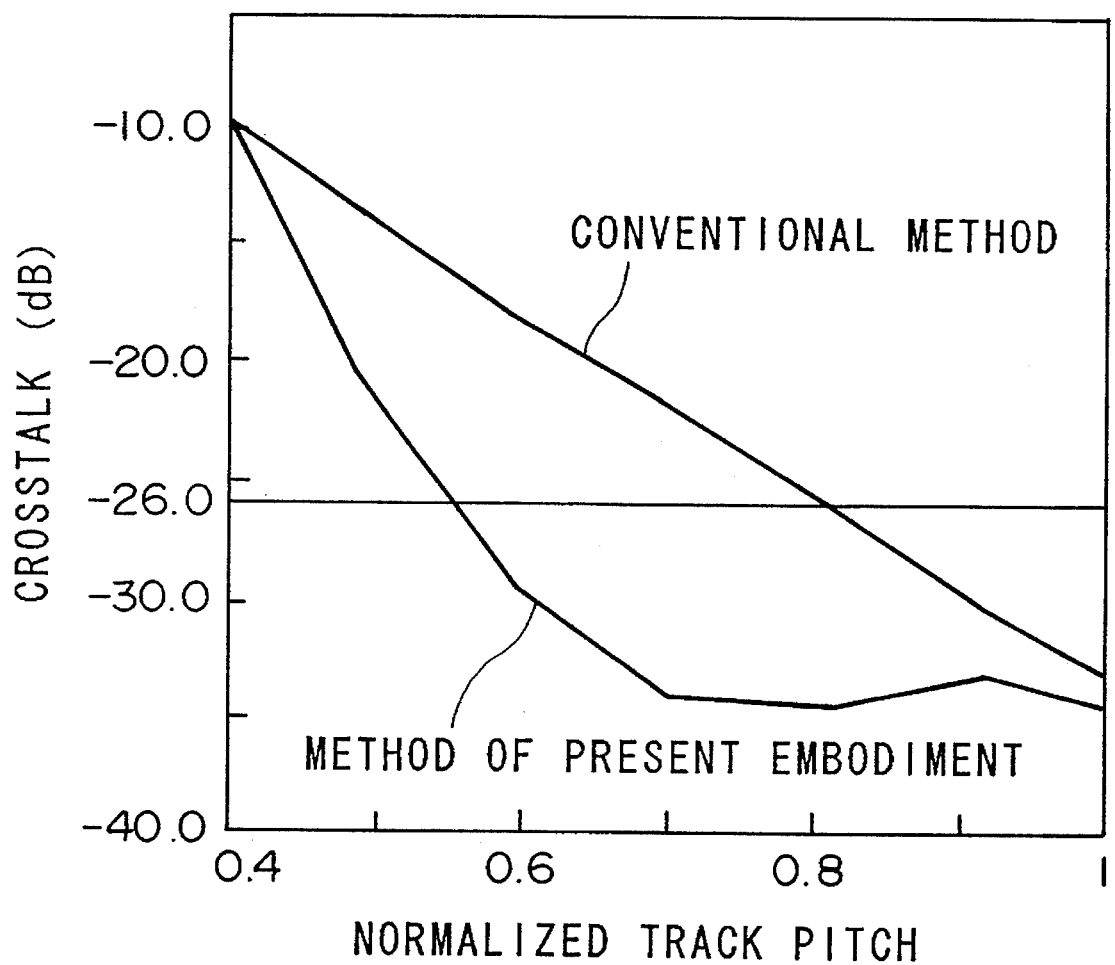
FIG. 16 shows a relationship between the crosstalk which the first optical beam receives from track n−2 and the track pitch.

FIG. 16 shows a relationship between the crosstalk which the first beam receives from track n−2 in the case of the present embodiment and the track pitch which is normalized by the spot size of the first optical beam 11. Here, the width of the recorded mark normalized by the spot size of the optical beam 11 is 85 percent of the track pitch. For the purpose of comparison, the crosstalk in a conventional method ill which data on one track is regenerated by one optical beam is also shown in FIG. 16.

In the case of using the method of the present embodiment, the crosstalk can be decreased in comparison with the case of the conventional method when the normalized track pitch is from 0.4 to 1.0, and when the normalized track pitch is from 0.7 to 1.0, the crosstalk can be maximally decreased in comparison with the conventional method. In addition, the crosstalk of "−26 dB" or less, which is necessary for guaranteeing excellent signal quality, can be realized when the normalized track pitch is from 0.55 to 1.0.

Fifth Embodiment

The fifth embodiment according to the present invention will be explained below with reference to FIG. 17.

Figure 17:
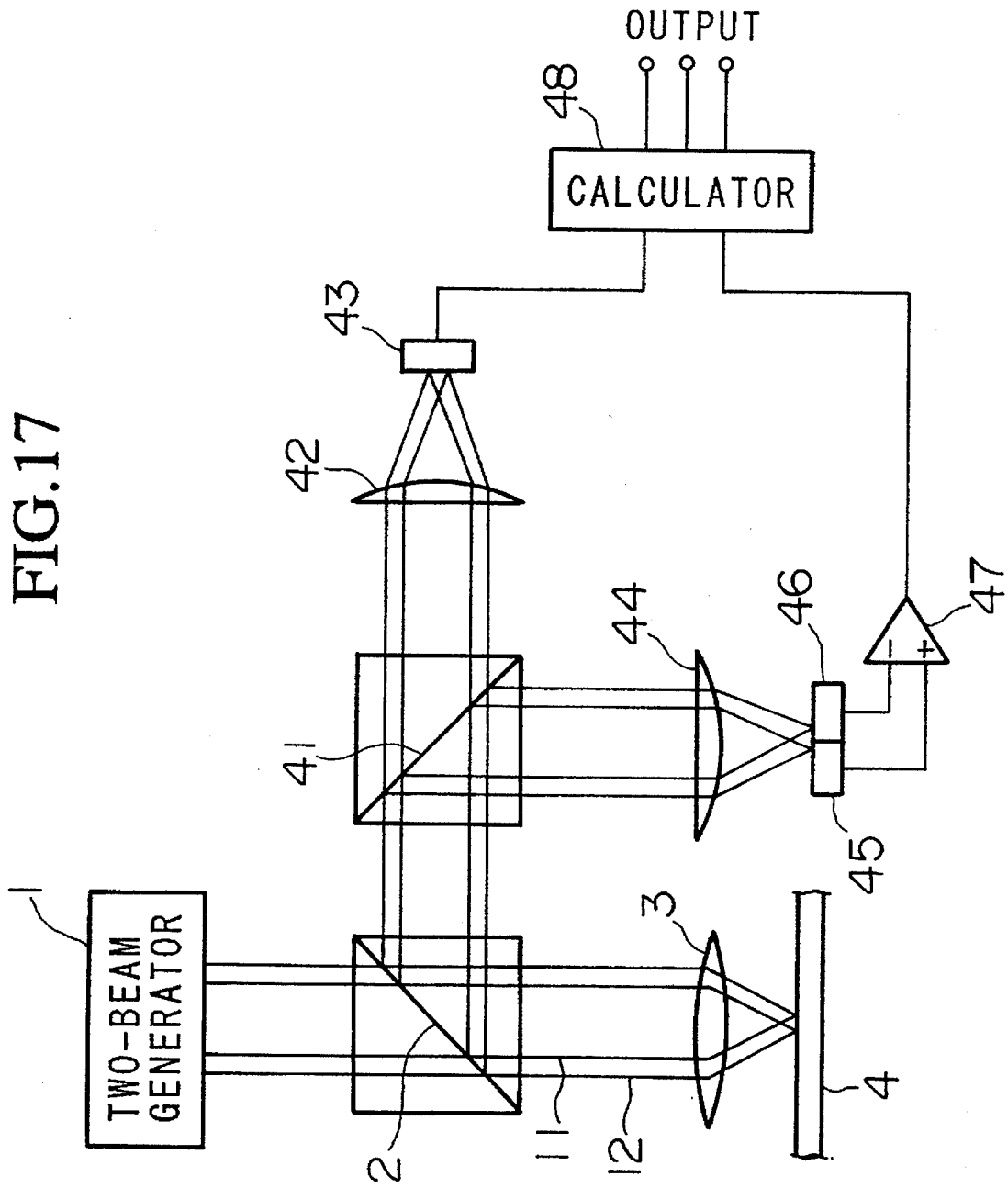
FIG. 17 is a block diagram showing the data readout apparatus according to the fifth embodiment of the present invention.

FIG. 17 is a block diagram of the data readout apparatus according to this embodiment. In this embodiment, the bundle of the regenerated beams from the optical recording medium are separated into two paths by a beam splitter, this feature being distinct from the above-explained fourth embodiment. In the figure, parts which are identical to those shown in FIG. 12 are given identical reference numbers, and an explanation thereof will be omitted here.

In FIG. 17, reference numeral 41 indicates an beam splitter, reference numeral 42 indicates a convergence lens for converging the transmitted beams from the beam splitter 41, reference numeral 43 indicates a photo-detector for beams to be combined, reference numeral 44 indicates a beam separator using a convergence lens for converging each beam reflected by the beam splitter 41, reference numeral 45 indicates a first photo-detector, reference numeral 46 indicates a second photo-detector, reference numeral 47 indicates a subtracter, and reference numeral 48 indicates a calculator.

The transmitted beams from beam splitter 41 (the transmitted beams of both of the regenerated beams from the first beam spot 11a and the second beam spot 12a) are converged at photo-detector 43 for beams to be combined by convergence lens 42, and a summation signal of the regenerated signals from the first and second beam spots 11a and 12a is output by the photo-detector 43.

Regarding the two regenerated beams which are reflected by beam splitter 41, the regenerated beam from the first beam spot 11a is converged at the first photo-detector by convergence lens 44, while the regenerated beam from the second beam spot 12a is converged at the second photo-detector by the convergence lens 44. The regenerated signals output from the first and second photo-detectors 45 and 46 are input into subtracter 47, and a difference signal of both the regenerated signals is output by the subtracter.

These summation and difference signals are input into calculator 48, and data recorded on three tracks n−1, n, and n+1 can be regenerated by calculating these signals by the calculator 48 according to the same method as that of the fourth embodiment.

According to the present embodiment in which an adder can be excluded, in addition to the facts that similar operations and merits as those of the fourth embodiment can be obtained, noise caused by the adder can be decreased; thus, signals of better quality can be obtained.

Sixth Embodiment

The sixth embodiment according to the present invention will be explained below with reference to FIG. 18.

Figure 18:
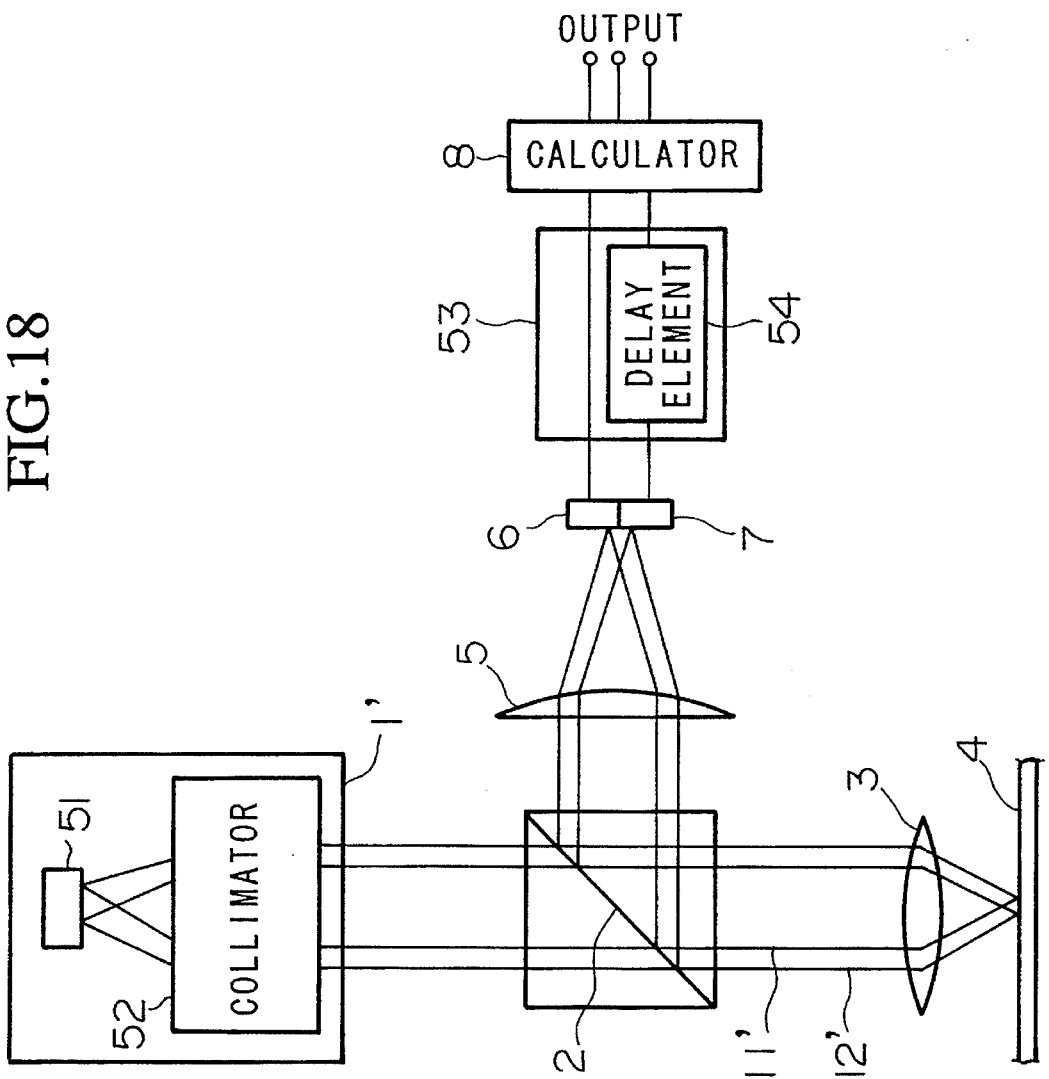
FIG. 18 is a block diagram showing the data readout apparatus according to the sixth embodiment of the present invention.

FIG. 18 is a block diagram of the data readout apparatus according to this embodiment and shows an arrangement using a multi-beam LD (laser diode), as a practical example. In the figure, parts which are identical to those shown in FIG. 1 are given identical reference numbers, and an explanation thereof will be omitted here.

In FIG. 18, two-beam generator 1' has two-beam LD 51, and two beams output from the two-beam LD 51 are transformed into two parallel beams (11' and 12') by collimator 52.

In general cases of the multi-beam LD, if the LD has emission points, the interval of any two of the points being 50 μm, the distance from one beam spot to another on an optical recording medium becomes approximately 10 μm in accordance to the optical system of the read-write head of the optical disk drive. Needless to say, this distance differs according to the arrangement of the optical system; however, it is difficult to considerably narrow the distance.

Figure 19:
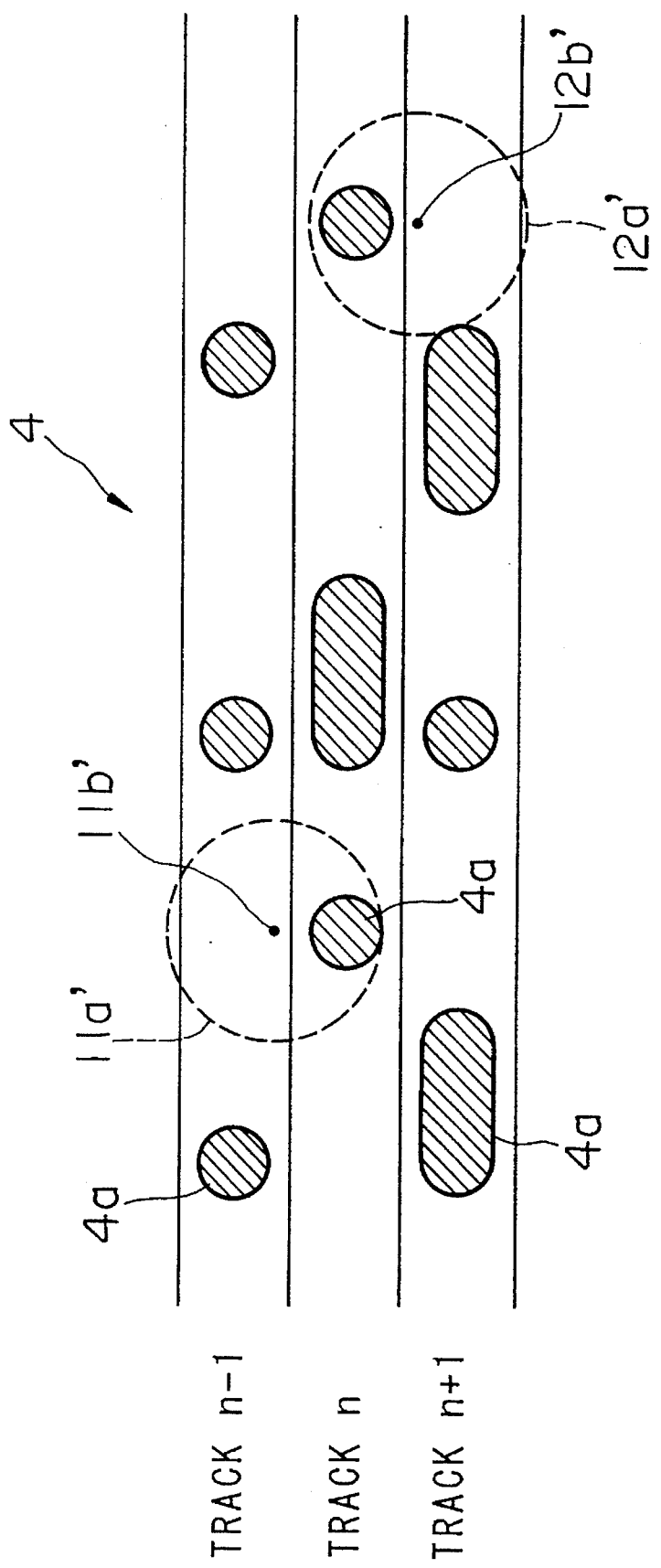
FIG. 19 shows a positional relationship between two beam spots and tracks on the optical recording medium in the sixth embodiment.

Therefore, in the case in which it is difficult to locate beams as shown in FIG. 2 due to the track pitch, the two beam spots (11a' and 12a') may be separated in a longitudinal direction of the tracks, as shown in FIG. 19. In this case, the input of one of the regenerated signals (here, the regenerated signal by the second optical beam) into calculator 8 is delayed by delay circuit 53 which includes delay element 54 as shown in FIG. 18, by a time which corresponds to the longitudinal distance between the two beam spots. In this way, effects similar to those of the first embodiment can be obtained.

Seventh Embodiment

The seventh embodiment according to the present invention wirl be explained below with reference to FIG. 20.

Figure 20:
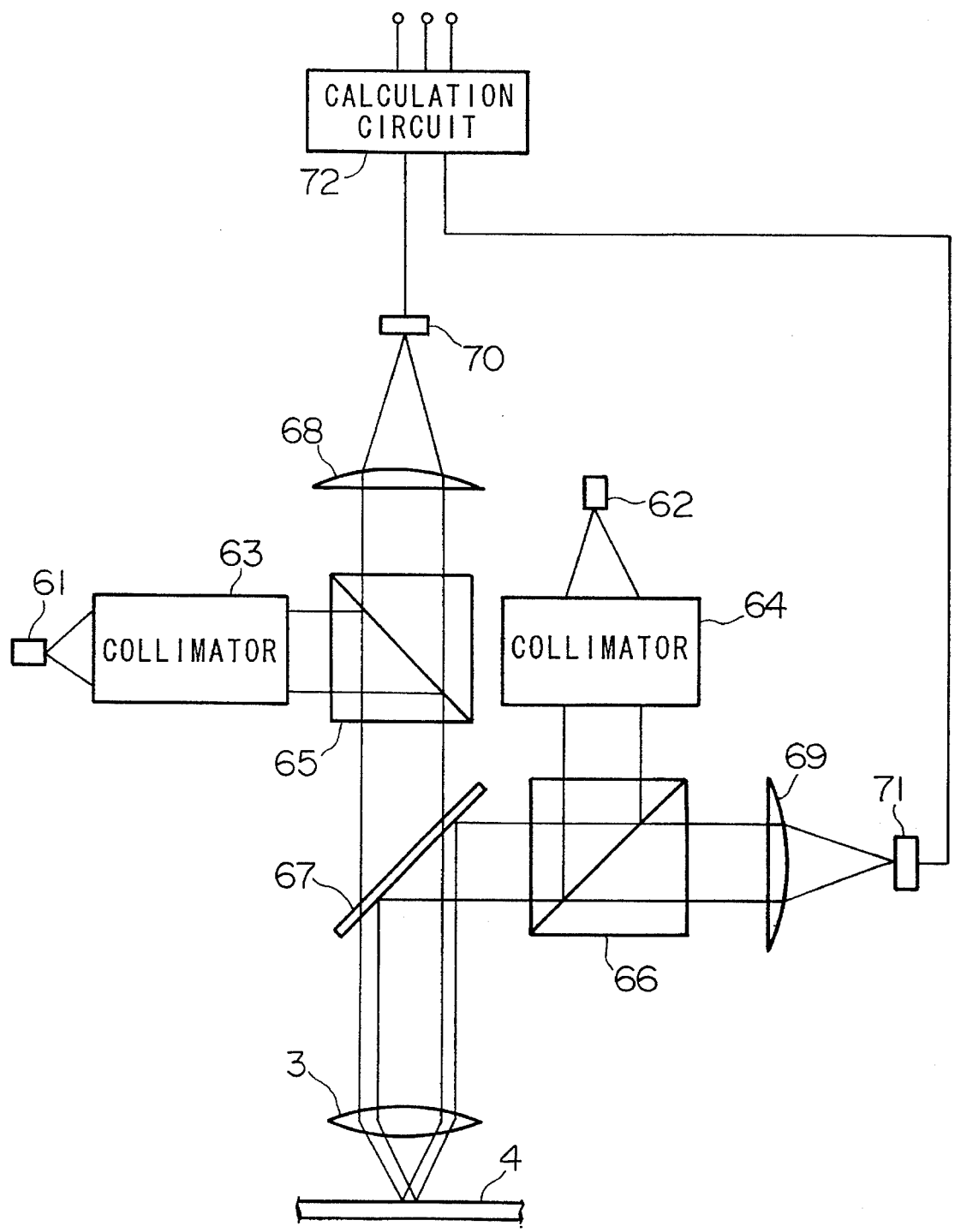
FIG. 20 is a block diagram showing the data readout apparatus according to the seventh embodiment of the present invention.

FIG. 20 is a block diagram of the data readout apparatus according to this embodiment and shows an example of using two beams of different wavelengths. In the figure, parts which are identical to those shown in FIG. 1 are given identical reference numbers, and an explanation thereof will be omitted here.

In FIG. 20, reference numerals 61 and 62 indicate LDs each of which emits an optical beam of different wavelength, reference numerals 63 and 64 indicate collimators which transform beams from LDs 61 and 62 into collimated beams, respectively, reference numerals 65 and 66 indicate beam splitters, and reference numeral 67 indicates a dichroic mirror which has wavelength selectivity, reference numerals 68 and 69 indicate convergence lenses, reference numerals 70 and 71 indicate photodiodes, and reference numeral 72 indicates a calculation circuit.

The first and second beams are output from LDs 61 and 62, each beam having a different wavelength; the first and second beams are input into beam splitters 65 and 66 via collimators 63 and 64, respectively; and the directions of the beams are changed by the beam splitters. The beams reflected from the beam splitters 65 and 66 are incident on dichroic mirror 67.

According to the difference of the wavelengths, the first beam is transmitted through the dichroic mirror 67, while the second beam is reflected at the mirror, and both beams are converged at two spots on three tracks of optical recording medium 4 via objective lens 3, as explained in the first embodiment.

The reflected beam from the first beam is transmitted through dichroic mirror 67 and beam splitter 65, respectively, and is converged at photodiode 70 by convergence lens 68. On the other hand, the reflected beam from the second beam is reflected by dichroic mirror 67 and is transmitted through beam splitter 66, and is converged at photodiode 71 by convergence lens 69. Each signal output from the photodiodes is input into calculation circuit 72 and data of the three tracks are regenerated by a method similar to that of the first embodiment.

That is, in this arrangement, the first and second beams with different wavelengths can be efficiently separated by dichroic mirror 67, and at the detection side, the two beams can be very efficiently separated by making use of the wavelength difference. Therefore, more certain data regeneration can be performed based on the signals which are regenerated by two beams without interference between them.

In addition, two laser beams with different polarization directions can also be used as the two optical beams. This is also possible in the second embodiment.

In such a case, the following arrangement may be used in which a polarizing element such as a birefringent prism, a polarizing plate, or a polarizing prism is provided in a beam generator so as to construct a two-beam generator which efficiently generates two beams by making use of the difference of the polarization directions. For such arrangement, a half mirror is preferable for the regenerated-beam separator. For the signal detection, an analyzer is further provided in front of the detector and the degree of rotation of the polarization direction is converted into the change of the quantity of light. In this way, as in the above case of using the wavelength difference, the two beams can be efficiently separated and signals can be regenerated from two beams without interference between them.

On the other hand, if an optomagnetic medium is used as the optical recording medium, marks are recorded on the medium by making use of the direction of the magnetization. That is, if parts of the recorded marks have upper-directed magnetization, the other parts of the medium have lower-directed magnetization. Therefore, when using the optomagnetic medium, necessary optical elements may be added in the optical system so as to perform signal detection based on the magnet-optical effect.

Figure 21:
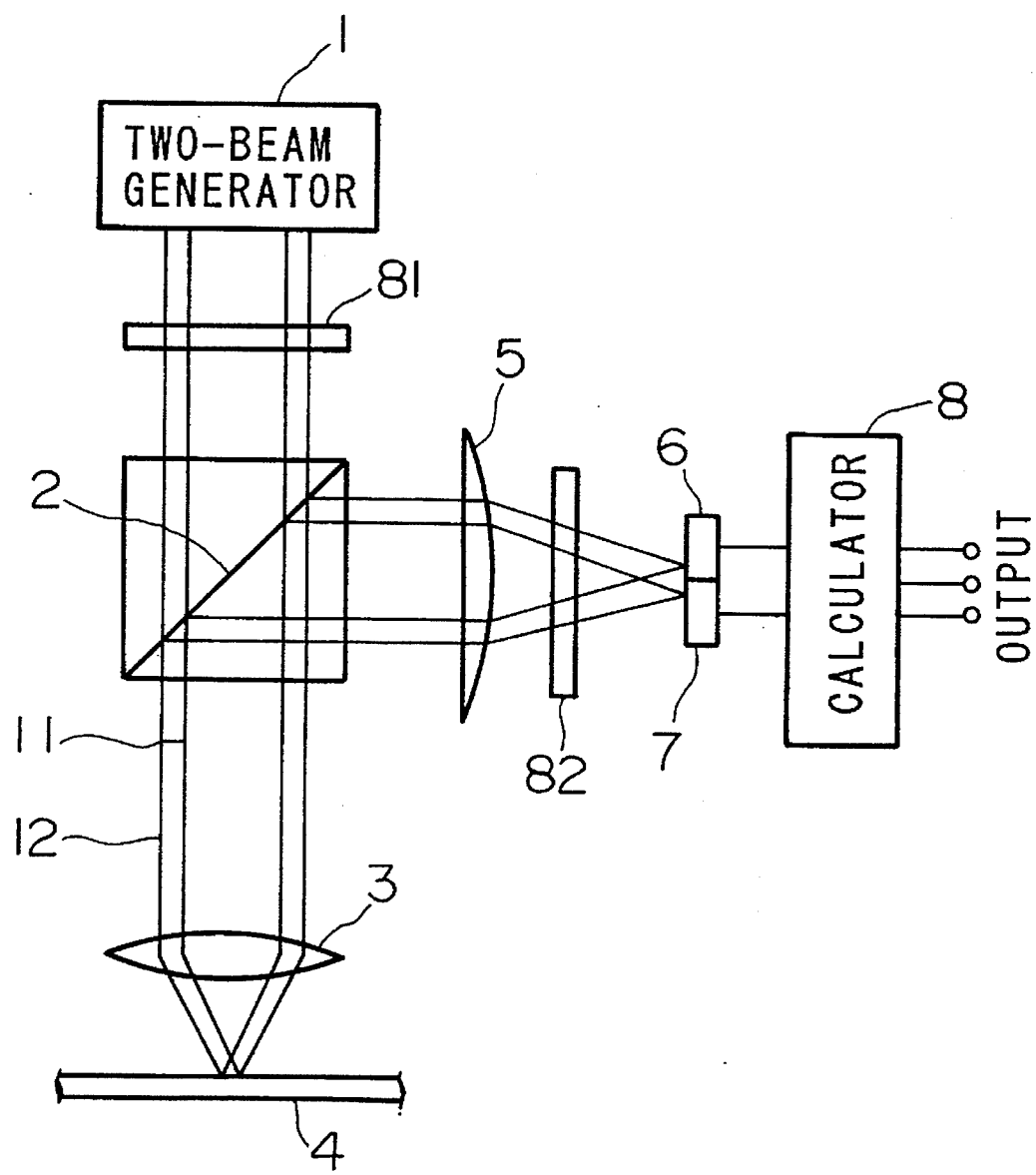
FIG. 21 is a block diagram showing an example of the data readout apparatus for the optomagnetic medium.

FIG. 21 shows a practical example of such arrangement. Parts which are identical to those shown in FIG. 1 are given identical reference numbers.

In this arrangement, polarizer 81 is inserted between two-beam generator 1 and regenerated-beam separator 2, for making each polarization direction of the beams even. The beams with the even polarization direction are incident on the recording medium 4. By irradiating the medium like this, the polarization direction of the reflected beam is slightly rotated in accordance with the magnetization direction of the marks recorded on the medium due to the magnet-optical effect. The reflected beam from the medium is then introduced to analyzer 82. The degree of the above rotation of the polarization direction is converted by the analyzer into the change of the light intensity in order that regenerated signals are detected by first and second photo-detectors 6 and 7.

As described above, the present invention can also be applied to the regeneration of signals recorded on the optomagnetic medium. The example of using the analyzer was explained with reference to FIG. 21, but the following arrangement is also possible in which a polarized beam splitter and a differential-type detector which has two detectors are used for each beam, by which the signal-to-noise ratio of the regenerated signals can be increased.

What is claimed is:

1. A data readout method for regenerating data recorded on an optical recording medium by using optical beams, the method comprising the steps of:

making a first optical beam incident on the optical recording medium in a manner such that in three successive tracks n−1, n, and n+1, n being an integer of two or more, on the recording medium, the center of the beam spot of the first optical beam lies, in a transverse direction of the tracks, between the boundary point of tracks n−1 and n and the center of track n−1;

making a second optical beam incident on the optical recording medium in a manner such that the center of the beam spot of the second optical beam lies, in the transverse direction of the tracks, between the boundary point of tracks n+1 and n and the center of track n+1;

detecting reflected beams of the first and second optical beams from the optical recording medium; and regenerating data recorded on the three tracks in accordance with amplitude levels of the detected reflected beams.

2. A data readout method as claimed in claim 1, wherein:

the first optical beam is made incident on a position satisfying the condition that the amplitude level of light reflected from track n+1 is from 1.5 times to 2.5 times as much as that of light reflected from track n; and the second optical beam is made incident on a position satisfying the condition that the amplitude level of light reflected from track n+1 is from 1.5 times to 2.5 times as much as that of light reflected from track n.

3. A data readout method for regenerating data recorded on an optical recording medium by using optical beams, the method comprising the steps of:

making a first optical beam incident on the optical recording medium in a manner such that in two successive tracks n−1 and n, n being an integer of two or more, on the recording medium, the center of the beam spot of the first optical beam lies, in a transverse direction of the tracks, between the boundary point of tracks n−1 and n and the center of track n−1;

making a second optical beam incident on the optical recording medium in a manner such that the center of the beam spot of the second optical beam lies, in the transverse direction of the tracks, between the boundary point of tracks n−1 and n and the center of track n;

detecting reflected beams of the first and second optical beams from the optical recording medium; and regenerating data recorded on the two tracks in accordance with amplitude levels of the detected reflected beams.

4. A data readout method as claimed in claim 3, wherein:

the first optical beam is made incident on a position satisfying the condition that the amplitude level of light reflected from track n−1 is from 1.5 times to 2.5 times as much as that of light reflected from track n; and the second optical beam is made incident on a position satisfying the condition that the amplitude level of light reflected from track n is from 1.5 times to 2.5 times as much as that of light from track n−1.

5. A data readout method for regenerating data recorded on an optical recording medium by using optical beams, the method comprising the steps of:

making a first optical beam incident on the optical recording medium in a manner such that in three successive tracks n−1, n, and n+1, n being an integer of two or more, on the recording medium, the center of the beam spot of the first optical beam lies, in a transverse direction of the tracks, between the boundary point of tracks n−1 and n and the center of track n;

making a second optical beam incident on the optical recording medium in a manner such that the center of the beam spot of the second optical beam lies, in the transverse direction of the tracks, between the boundary point of tracks n+1 and n and the center of track n;

detecting reflected beams of the first and second optical beams from the optical recording medium; and regenerating data recorded on the three tracks in accordance with amplitude levels of the detected reflected beams.

6. A data readout method as claimed in claim 5, wherein:

the first optical beam is made incident on a position satisfying the condition that the amplitude level of light reflected from track n is more than one and not more than three times as much as that of light reflected from track n−1; and the second optical beam is made incident on a position satisfying the condition that the amplitude level of light reflected from track n is more than one and not more than three times as much as that of light reflected from track n+1.

7. A data readout method as claimed in one of claims 1, 3, and 5, wherein:

the step of detecting reflected beams of the first and second optical beams comprises the steps of:
outputting first and second regenerated signals which indicate amplitude levels of the detected reflected beams, and
outputting a summation signal obtained by adding the first and second regenerated signals and a difference signal obtained by subtracting one regenerated signal from the other; and the step of regenerating data comprises regenerating the data in accordance with the combination of a value of the summation signal and a value of the difference signal.

8. A data readout method as claimed in one of claims 1, 3, and 5, wherein:

the step of detecting reflected beams of the first and second optical beams comprises the steps of:
splitting the bundle of the reflected beams of the first and second optical beams into two portions, detecting one portion of the bundle of the reflected beams all together and outputting a summation signal which indicates the sum of amplitude levels of both the reflected beams, and detecting each reflected beam from the other portion of the bundle of the reflected beams, outputting first and second regenerated signals each of which indicates amplitude level of each reflected beam, and outputting a difference signal obtained by subtracting one regenerated signal from the other; and the step of regenerating data involves regenerating the data in accordance with the combination of a value of the summation signal and a value of the difference signal.

9. A data readout method as claimed in one of claims 1, 3, and 5, wherein the wavelengths of the first and second optical beams are different from each other.

10. A data readout method as claimed in one of claims 1, 3, and 5, wherein the directions of polarization of the first and second optical beams are different from each other.

11. A data readout apparatus for regenerating data recorded on an optical recording medium by using optical beams, the apparatus comprising:

an optical beam generating means for generating first and second optical beams;

a first converging means for converging the first optical beam to the optical recording medium in a manner such that in three successive tracks n−1, n, and n+1, n being an integer of two or more, on the recording medium, the center of the beam spot of the first optical beam lies, in a transverse direction of the tracks, between the boundary point of tracks n+1 and n and the center of track n−1;

a second converging means for converging the second optical beam to the optical recording medium in a manner such that the center of the beam spot of the second optical beam lies, in the transverse direction of the tracks, between the boundary point of tracks n+1 and n and the center of track n+1;

a first photo-detecting means for detecting a reflected beam of the first optical beam from the optical recording medium;

a second photo-detecting means for detecting a reflected beam of the second optical beam from the optical recording medium; and a calculating means for performing calculation in accordance with amplitude levels of the detected reflected beams so as to regenerate data recorded on the three tracks.

12. A data readout apparatus as claimed in claim 11, wherein:

the first optical beam is converged on a position satisfying the condition that the amplitude level of light reflected from track n+1 is from 1.5 times to 2.5 times as much as that of light reflected from track n; and the second optical beam is converged on a position satisfying the condition that the amplitude level of light reflected from track n+1 is from 1.5 times to 2.5 times as much as that of light reflected from track n.

13. A data readout apparatus for regenerating data recorded on an optical recording medium by using optical beams, the apparatus comprising:

an optical beam generating means for generating first and second optical beams;

a first converging means for converging the first optical beam to the optical recording medium in a manner such that in two successive tracks n−1 and n, n being an integer of two or more, on the recording medium, the center of the beam spot of the first optical beam lies, in a transverse direction of the tracks, between the boundary point of tracks n−1 and n and the center of track n−1;

a second converging means for converging the second optical beam to the optical recording medium in a manner such that the center of the beam spot of the second optical beam lies, in the transverse direction of the tracks, between the boundary point of tracks n−1 and n and the center of track n;

a first photo-detecting means for detecting a reflected beam of the first optical beam from the optical recording medium;

a second photo-detecting means for detecting a reflected beam of the second optical beam from the optical recording medium; and a calculating means for performing calculation in accordance with amplitude levels of the detected reflected beams so as to regenerate data recorded on the two tracks.

14. A data readout apparatus as claimed in claim 13, wherein:

the first optical beam is converged on a position satisfying the condition that the amplitude level of light reflected from track n−1 is from 1.5 times to 2.5 times as much as that of light reflected from track n; and the second optical beam is converged on a position satisfying the condition that the amplitude level of light reflected from track n is from 1.5 times to 2.5 times as much as that of light reflected from track n−1.

15. A data readout apparatus for regenerating data recorded on an optical recording medium by using optical beams, the apparatus comprising:

an optical beam generating means for generating first and second optical beams;

a first converging means for converging the first optical beam to the optical recording medium in a manner such that in three successive tracks n−1, n, and n+1, n being an integer of two or more, on the recording medium, the center of the beam spot of the first optical beam lies, in a transverse direction of the tracks, between the boundary point of tracks n−1 and n and the center of track n;

a second converging means for converging the second optical beam to the optical recording medium in a manner such that the center of the beam spot of the second optical beam lies, in the transverse direction of the tracks, between the boundary point of tracks n+1 and n and the center of track n;

a first photo-detecting means for detecting a reflected beam of the first optical beam from the optical recording medium;

a second photo-detecting means for detecting a reflected beam of the second optical beam from the optical recording medium; and a calculating means for performing calculation in accordance with amplitude levels of the detected reflected beams so as to regenerate data recorded on the three tracks.

16. A data readout apparatus as claimed in claim 15, wherein:

the first optical beam is converged on a position satisfying the condition that the amplitude level of light reflected from track n is more than one and not more than three times as much as that of light reflected from track n−1; and the second optical beam is converged on a position satisfying the condition that the amplitude level of light reflected from track n is more than one and not more than three times as much as that of light reflected from track n+1.

17. A data readout apparatus as claimed in one of claims 11, 13, and 15, further comprising:

an addition means for adding amplitude levels of the reflected beams detected by the first and second photo-detecting means and outputting a summation signal as a result of the summation; and a subtracting means for obtaining the difference of amplitude levels of the reflected beams detected by the first and second photo-detecting means and outputting a difference signal as a result of the subtraction, and wherein:

the calculating means regenerates the data in accordance with the combination of a value of the summation signal and a value of the difference signal.

18. A data readout apparatus as claimed in one of claims 11, 13, and 15, wherein the wavelengths of the first and second optical beams are different from each other.

19. A data readout apparatus as claimed in one of claims 11, 13 and 15, wherein the directions of polarization of the first and second optical beams are different from each other.

20. A data readout apparatus as claimed in one of claims 11, 13, and 15, wherein the optical beam generating means has a multi-beam laser diode, and the data readout apparatus further comprising:

a delay means, provided between the second photo-detecting means and the calculating means, for making the output from the second photo-detecting means input into the calculating means later than the output from the first photo-detecting means inputs into the calculating means.

21. A data readout apparatus as claimed in one of claims 11. 13, and 15, wherein the optical beam generating means has a multi-beam laser diode, and the data readout apparatus further comprising:

a delay means, provided between the first photo-detecting means and the calculating means, for making the output from the first photo-detecting means input into the calculating means later than the output from the second photo-detecting means inputs into the calculating means.

* * * * *

UNITED STATES PATENT AND TRADEMARK OFFICE
CERTIFICATE OF CORRECTION

PATENT NO. : 5,619,487
DATED : April 08, 1997
INVENTOR(S) : Takaya TANABE et al.

It is certified that error appears in the above-indentified patent and that said Letters Patent is hereby corrected as shown below:

Claim 2, column 16, line 46, "n+1" should read --n-1--.

Claim 11, column 18, line 31, "n+1" should read --n-1--.

Claim 12, column 18, line 54, "n+1" should read --n-1--.

Signed and Sealed this

Twenty-third Day of September, 1997

Attest:

BRUCE LEHMAN

Attesting Officer

Commissioner of Patents and Trademarks